US012370113B2

(12) United States Patent
Lee et al.

(10) Patent No.: US 12,370,113 B2
(45) Date of Patent: Jul. 29, 2025

(54) PATIENT POSITIONING SYSTEM

(71) Applicant: Alphatec Spine, Inc., Carlsbad, CA (US)

(72) Inventors: James Lee, Carlsbad, CA (US); Christopher Joseph Sheehan, San Diego, CA (US); Andrew W. Rajek, Escondido, CA (US)

(73) Assignee: ALPHATEC SPINE, INC., Carlsbad, CA (US)

( * ) Notice: Subject to any disclaimer, the term of this patent is extended or adjusted under 35 U.S.C. 154(b) by 176 days.

(21) Appl. No.: 18/231,574

(22) Filed: Aug. 8, 2023

(65) Prior Publication Data

US 2023/0414435 A1 Dec. 28, 2023

Related U.S. Application Data

(62) Division of application No. 17/163,952, filed on Feb. 1, 2021, now Pat. No. 11,744,758.

(60) Provisional application No. 63/114,660, filed on Nov. 17, 2020, provisional application No. 62/969,532, filed on Feb. 3, 2020.

(51) Int. Cl.
*A61G 13/12* (2006.01)

(52) U.S. Cl.
CPC ......... *A61G 13/129* (2013.01); *A61G 13/122* (2013.01); *A61G 13/1225* (2013.01); *A61G 13/123* (2013.01)

(58) Field of Classification Search
CPC ................ A61G 13/122; A61G 13/129; A61G 13/1225; A61G 13/123
See application file for complete search history.

(56) References Cited

U.S. PATENT DOCUMENTS

| | | | |
|---|---|---|---|
| 1,830,071 | A | 11/1931 | Patton |
| 2,691,979 | A | 10/1954 | Watson |
| 3,823,709 | A | 7/1974 | McGuire |
| 5,079,789 | A | 1/1992 | Jandrakovic |
| 5,088,706 | A | 2/1992 | Jackson |
| 5,131,106 | A | 7/1992 | Jackson |
| 5,311,622 | A | 5/1994 | Allen |
| 5,390,383 | A | 2/1995 | Carn |
| 5,422,928 | A | 6/1995 | Payne |

(Continued)

FOREIGN PATENT DOCUMENTS

| | | | |
|---|---|---|---|
| CA | 2962567 | A1 | 3/2016 |
| CN | 202342383 | U | 7/2012 |

(Continued)

OTHER PUBLICATIONS

Australian Patent Office, "First Examination Report," Australian Application No. 2021215729, Sep. 6, 2023.

(Continued)

*Primary Examiner* — Adam C Ortiz
(74) *Attorney, Agent, or Firm* — Dentons Durham Jones Pinegar; Sarah W. Matthews

(57) ABSTRACT

A patient support system may include a pelvic bolster assembly and a thoracic bolster assembly. Each of the assemblies may be attached to a conventional surgical table frame by the surgical table frame's longitudinal rails. A plurality of adjustment mechanisms and components are provided to allow for easy and safe manipulation of a patient before and during surgery.

20 Claims, 34 Drawing Sheets

(56) References Cited

U.S. PATENT DOCUMENTS

| | | | |
|---|---|---|---|
| D390,958 | S | 2/1998 | Lathrop |
| 5,724,970 | A | 3/1998 | Votruba et al. |
| 5,758,647 | A | 6/1998 | Cummins |
| 6,003,176 | A | 12/1999 | Wasley et al. |
| 6,076,525 | A | 6/2000 | Hoffman |
| 6,260,220 | B1 | 7/2001 | Lamb et al. |
| 6,311,349 | B1 | 11/2001 | Kazakia et al. |
| 6,374,438 | B1 | 4/2002 | Fox et al. |
| 6,934,987 | B2 | 8/2005 | Newkirk et al. |
| 6,941,951 | B2 | 9/2005 | Hubert et al. |
| 7,120,954 | B2 | 10/2006 | Traut et al. |
| 7,185,656 | B2 | 3/2007 | Wakhloo et al. |
| 7,189,214 | B1 | 3/2007 | Saunders |
| 7,234,180 | B2 | 6/2007 | Horton et al. |
| 7,600,281 | B2 | 10/2009 | Skripps |
| 8,099,808 | B1 * | 1/2012 | McKeon ............ A61G 13/0063 5/624 |
| 8,118,029 | B2 | 2/2012 | Gneiting et al. |
| 8,234,730 | B2 | 8/2012 | Skripps |
| 8,286,283 | B2 | 10/2012 | Copeland et al. |
| D676,971 | S | 2/2013 | Sharps |
| 8,635,725 | B2 | 1/2014 | Tannoury et al. |
| 8,707,476 | B2 | 4/2014 | Sharps |
| 9,072,646 | B2 | 7/2015 | Skripps et al. |
| 9,168,009 | B2 | 10/2015 | Lee |
| 9,192,534 | B2 | 11/2015 | Coppens et al. |
| 9,254,217 | B2 | 2/2016 | Zacharopoulos et al. |
| 9,339,430 | B2 | 5/2016 | Jackson et al. |
| 9,446,260 | B2 | 9/2016 | Jagger |
| 9,498,397 | B2 | 11/2016 | Hight et al. |
| 9,522,078 | B2 | 12/2016 | Pizzini |
| 9,554,959 | B2 | 1/2017 | Carn |
| 9,622,928 | B2 | 4/2017 | Jackson et al. |
| 9,750,657 | B2 | 9/2017 | Drake |
| 9,937,006 | B2 | 4/2018 | Skripps et al. |
| 10,045,768 | B2 | 8/2018 | Garcia-Bengochea et al. |
| 10,314,758 | B2 | 6/2019 | Dolliver et al. |
| 10,335,097 | B2 | 7/2019 | Kaiser et al. |
| 10,335,338 | B2 | 7/2019 | Nichols et al. |
| 10,426,684 | B2 | 10/2019 | Dubois et al. |
| 10,729,607 | B2 | 8/2020 | Jackson et al. |
| 10,751,240 | B2 | 8/2020 | Lim et al. |
| 10,813,807 | B2 | 10/2020 | Bartley |
| 10,835,438 | B2 | 11/2020 | Jackson |
| 10,835,439 | B2 | 11/2020 | Lim et al. |
| 10,849,809 | B2 | 12/2020 | Lim et al. |
| 10,869,798 | B2 | 12/2020 | Jackson et al. |
| 10,874,570 | B2 | 12/2020 | Lim et al. |
| 10,881,566 | B2 | 1/2021 | Jackson |
| 10,881,570 | B2 | 1/2021 | Lim et al. |
| 10,888,484 | B2 | 1/2021 | Lim et al. |
| 10,893,996 | B2 | 1/2021 | Lim et al. |
| 10,900,448 | B2 | 1/2021 | Lim et al. |
| 11,013,570 | B2 | 5/2021 | Skripps et al. |
| 2004/0133979 | A1 | 7/2004 | Newkirk et al. |
| 2006/0123546 | A1 * | 6/2006 | Horton ............... A61G 13/0054 5/624 |
| 2006/0162076 | A1 | 7/2006 | Bartlett et al. |
| 2006/0248650 | A1 * | 11/2006 | Skripps .............. A61G 13/0054 5/624 |
| 2009/0199339 | A1 | 8/2009 | Barr |
| 2010/0192300 | A1 | 8/2010 | Tannoury et al. |
| 2014/0137327 | A1 | 5/2014 | Tannoury et al. |
| 2016/0000621 | A1 | 1/2016 | Jackson et al. |
| 2016/0151224 | A1 * | 6/2016 | Ferro ................. A61G 13/1295 128/845 |
| 2016/0193098 | A1 | 7/2016 | Nichols et al. |
| 2016/0193099 | A1 | 7/2016 | Drake |
| 2016/0331613 | A1 * | 11/2016 | Lee ........................ A61G 13/02 |
| 2017/0112698 | A1 | 4/2017 | Hight et al. |
| 2017/0319411 | A1 | 11/2017 | Jackson |
| 2018/0011689 | A1 | 1/2018 | Motamedi et al. |
| 2018/0221229 | A1 | 8/2018 | Kaiser et al. |
| 2019/0000707 | A1 | 1/2019 | Lim et al. |
| 2019/0117488 | A1 | 4/2019 | Ebara |
| 2019/0209409 | A1 | 7/2019 | Jackson et al. |
| 2020/0281787 | A1 * | 9/2020 | Ruiz ...................... A61B 34/37 |
| 2020/0281788 | A1 | 9/2020 | Lim et al. |
| 2020/0281789 | A1 | 9/2020 | Jackson |
| 2020/0297568 | A1 | 9/2020 | Lim et al. |
| 2020/0315892 | A1 | 10/2020 | Jackson |
| 2020/0330309 | A1 | 10/2020 | Jackson et al. |
| 2020/0330310 | A1 | 10/2020 | Jackson et al. |
| 2020/0337923 | A1 | 10/2020 | Lim et al. |
| 2020/0337926 | A1 | 10/2020 | Lim et al. |
| 2020/0337927 | A1 | 10/2020 | Lim et al. |
| 2020/0337929 | A1 | 10/2020 | Lim et al. |
| 2020/0360214 | A1 | 11/2020 | Lim et al. |
| 2021/0015693 | A1 | 1/2021 | Lim |
| 2021/0113395 | A1 | 4/2021 | Viveros Hudin et al. |
| 2021/0236369 | A1 | 8/2021 | Lee et al. |

FOREIGN PATENT DOCUMENTS

| | | | | |
|---|---|---|---|---|
| CN | 213788296 | U | 7/2021 | |
| DE | 102009034613 | A1 | 2/2011 | |
| DE | 202013100213 | U1 | 3/2013 | |
| EP | 1163881 | B1 | 3/2006 | |
| EP | 1219276 | B1 | 8/2006 | |
| EP | 1874255 | B1 | 2/2014 | |
| FR | 2814941 | A1 | 4/2002 | |
| JP | 4083129 | B2 | 4/2008 | |
| JP | 5311235 | B2 | 10/2013 | |
| WO | 2009076483 | A1 | 6/2009 | |
| WO | 2013058806 | A1 | 4/2013 | |
| WO | 2014193739 | A1 | 12/2014 | |
| WO | WO-2017183632 | A1 * | 10/2017 | ............ A61F 2/042 |

OTHER PUBLICATIONS

European Patent Office, "Extended European Search Report," European Application No. 21750233, filed Jan. 29, 2024.

EPO acting as International Searching Authority, "International Search Report and Written Opinion," for international application No. PCT/US2024/023746, mailed Jul. 9, 2024.

International Bureau, "Notification Concerning International Preliminary Report on Patentability," for International Application No. PCT/US2021/016095, issued Jul. 28, 2022, mailed Aug. 18, 2022.

USPTO acting as International Searching Authority, "International Search Report and Written Opinion," for international application No. PCT/US2021/016095, mailed Apr. 8, 2021.

* cited by examiner

PATIENT POSITIONING SYSTEM

RELATED APPLICATIONS

This application is a divisional of U.S. nonprovisional application Ser. No. 17/163,952, filed Feb. 1, 2021, which claims priority to U.S. Provisional Application Nos. 62/969,532—filed Feb. 3, 2020—and 63/114,660—filed Nov. 17, 2020—all of which are incorporated herein by reference in their entireties.

TECHNICAL FIELD

The present disclosure relates generally to a patient positioning system, which may be used to position a patient during spine surgery. More specifically, the present disclosure relates to a patient positioning system with a thoracic and pelvic support, each which may be individually rotatable in a coronal plane and provided with patient lateral supports.

RELATED ART

Spinal surgery may be used to treat various conditions, such as degenerative disc disease, recurrent disc herniation, spinal instability, spondylolisthesis, pseudoarthrosis, osteomyelitis/discitis, post-laminectomy syndrome, and trauma. Various approaches may be taken by a surgeon for spinal surgery, including back (posterior), front (anterior), and side (lateral). Lateral access may be preferred as a less invasive approach than anterior access and may provide better positioning than posterior access.

To achieve successful lateral access, there is a need for a patient support structure that can be rotated, articulated, and angulated so that the patient can be moved, and intra-operative extension and flexion of at least a portion of the spinal column can be achieved to change lumbar lordosis. The patient support structure may also be capable of cooperating with the biomechanics of the patient for easy, selective adjustment of the patient intraoperatively.

SUMMARY

According to one aspect, a patient support system, may comprise a pelvic bolster assembly and a thoracic bolster assembly. In some configurations, the pelvic bolster assembly may comprise a base having a lower portion and an upper portion, the lower portion and upper portion connected via a drive feature—such as a worm drive, rack and pinion, a hypoid, a spiral bevel gear, etc.—such that the upper portion is rotatable relative to the lower portion in a coronal plane. The lower portion of the base may have a first channel, such as a C-channel or another shape like a trapezoidal shape, on a first lateral side and a second C-channel on an opposing lateral side, with the first and second C-channels slidably mountable on opposing rails of a surgical bed frame.

According to another aspect, the pelvic bolster assembly may include one or more lateral bolsters. For example, a first lateral bolster may be removably attached to a first lateral side of the upper portion of the base and a second lateral bolster may be attached to an opposing lateral side of the upper portion of the base. The first lateral bolster and second lateral bolster may be adjustable in a transverse plane.

In some configurations, the thoracic bolster assembly may comprise a base having a lower portion and an upper portion, the lower portion and upper portion connected via a drive mechanism, such as a worm drive, such that the upper portion is rotatable relative to the lower portion in a coronal plane of the patient. The lower portion of the base may have a first C-channel on a first lateral side and a second C-channel on an opposing lateral side, with the first and second C-channels slidably mountable with opposing rails of a surgical bed frame.

According to another aspect, the thoracic bolster assembly may include one or more lateral bolsters. For example, a first lateral bolster may be removably attached to a first lateral side of the upper portion of the base, and a second lateral bolster may be removably attached to an opposing lateral side of the upper portion of the base. The first lateral bolster and second lateral bolster may be adjustable in a sagittal plane and in a transverse plane.

In some configurations, the pelvic bolster assembly further comprises a pelvic support pad attached to the upper portion of the base of the pelvic bolster assembly. In some configurations, the thoracic bolster assembly further comprises a thoracic support pad attached to the upper portion of the base of the thoracic bolster assembly.

In some embodiments, the upper portion of the base of the pelvic bolster assembly further comprises a first gusset and a second gusset attached thereto, where the first pelvic support pad is connected to the first gusset and the second pelvic support pad is connected to the second gusset.

In some embodiments, the first lateral bolster is removably attached to the first lateral side of the upper portion of the base, and the second lateral bolster is removably attached to the opposing lateral side of the upper portion of the base.

According to another aspect, a method for positioning a patient is disclosed. The method may comprise, for example, selecting a patient support system as described herein; selecting a surgical bed frame having a longitudinal axis and two opposing side rails extending along the longitudinal axis; slidably mounting the first and second C-channels of the pelvic bolster assembly on the two opposing side rails of the surgical bed frame; and slidably mounting the first and second C-channels of the thoracic bolster assembly on two opposing side rails of the surgical bed frame.

In some configurations, the method further comprises sliding one or more of the pelvic bolster assembly and thoracic bolster assembly to selectively space apart the pelvic bolster assembly and thoracic bolster assembly.

The method may include placing a patient in a prone position on the patient support system, including placing at least a portion of the patient's chest on the thoracic bolster assembly. The patient may be placed in a prone position on the patient support system, including placing at least a portion of the patient's pelvis on the pelvic bolster assembly.

The method may include the step of engaging the coronal adjustment handle on the pelvic bolster assembly to rotate the pelvis of the patient about the sagittal axis while the patient is supported by the pelvic bolster assembly. Engaging the coronal adjustment handle on the pelvic bolster assembly comprises rotating the worm shaft of the lower portion of the base, which in turn rotates the worm wheel of the upper portion of the base about the sagittal axis. A clinician may engage the coronal adjustment handle on the thoracic bolster assembly to rotate the chest of the patient about the sagittal axis while the patient is supported by the thoracic bolster assembly. Engaging the coronal adjustment handle on the thoracic bolster assembly may include rotating the worm shaft of the lower portion of the base, which in turn rotates the worm wheel of the upper portion of the base about the sagittal axis.

The method may also include wrapping one or more straps around the patient, from one lateral bolster to an opposing lateral bolster, and rotating the patient about the longitudinal axis. In some methods, a strap may extend from one lateral bolster, wrap around the patient—including the bed frame—and be secured at the same lateral bolster. In some methods, a strap extends from one lateral bolster, loops through a D-ring or similar device on the second lateral bolster, and returns to the first lateral bolster to be secured.

Other aspects of the disclosed subject matter, as well as features and advantages of various aspects of the disclosed subject matter, should be apparent to those of ordinary skill in the art through consideration of the ensuing description, the accompanying drawings, and the appended claims.

BRIEF DESCRIPTION OF DRAWINGS

The following drawings illustrate what are currently considered to be specific representative configurations for carrying out the disclosed subject matter and are not limiting as to embodiments which may be made in accordance with this disclosure. The components in the drawings are not necessarily to scale relative to each other. Like reference numerals designate corresponding parts throughout the several views.

DETAILED DESCRIPTION

Figure 1:
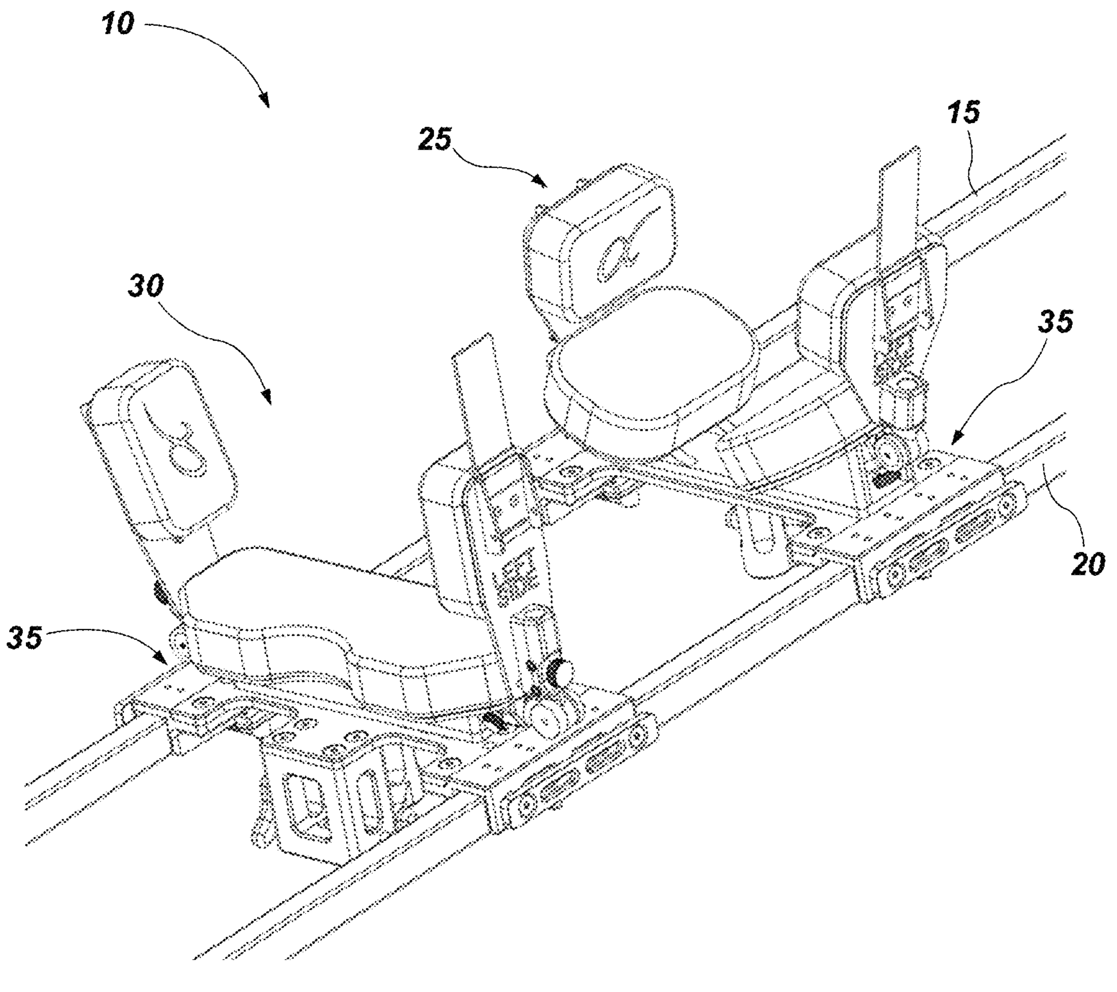
FIG. 1 is a perspective of a patient positioning system as described herein, positioned on a standard surgical frame rail.

Hereinafter, exemplary embodiments of the present disclosure will be described in detail with reference to the accompanying drawings. Advantages and features of the present disclosure and methods accomplishing them will become apparent from the following description of exemplary embodiments with reference to the accompanying drawings.

It will be appreciated that various aspects discussed in reference to one drawing may be present and/or used in conjunction with the embodiment shown in another drawing, and each element shown in multiple drawings may be discussed only once.

Reference in the specification to "one configuration," "one embodiment," "a configuration," or "an embodiment" means that a particular feature, structure, or characteristic described in connection with the configuration is included in at least one configuration, but is not a requirement that such feature, structure, or characteristic be present in any particular configuration unless expressly set forth in the claims as being present. The appearances of the phrase "in one configuration" in various places may not necessarily limit the inclusion of a particular element of the invention to a single configuration, rather the element may be included in other or all configurations discussed herein.

Furthermore, the described features, structures, or characteristics of configurations of the disclosed subject matter may be combined in any suitable manner in one or more configurations. In the following description, numerous specific details are provided, such as examples of products or manufacturing techniques that may be used, to provide a thorough understanding of configurations of the disclosed subject matter. One of ordinary skill in the relevant art will recognize, however, that configurations of the disclosed subject matter may be practiced without one or more of the specific details, or with other methods, components, materials, and so forth. In other instances, well-known structures, materials, or operations are not shown or described in detail to avoid obscuring aspects of the invention.

It should also be noted that, as used in this specification and the appended claims, singular forms such as "a," "an," and "the" may include the plural unless the context clearly dictates otherwise. Thus, for example, reference to "a base" may include one or more of such bases, and reference to "the bolster" may include reference to one or more of such bolsters.

As used herein, a plurality of items, structural elements, compositional elements, and/or materials may be presented in a common list for convenience. However, these lists should be construed as though each member of the list is individually identified as a separate and unique member.

As used herein, a "coronal plane" refers to a plane dividing the body into anterior and posterior parts, and any plane parallel to the coronal plane. A "sagittal plane" refers to a plane dividing the body into left and right parts, and any plane parallel to the sagittal plane. A "sagittal axis" refers to a rotational axis lying in the sagittal plane. A "transverse plane" refers to a plane dividing the body into superior and inferior parts, and any plane parallel to the transverse plane.

This disclosure generally relates to a patient positioning system that may be used in spinal surgical procedures. One particular embodiment of the present disclosure is shown and described in a patient positioning system of FIG. 1 and FIG. 2. FIG. 1 is a perspective view of a patient positioning system 10 positioned on two opposing rails of a surgical frame bed. The patient positioning system 10 may generally include a pelvic bolster assembly 25 and a thoracic bolster assembly 30. A first rail 15 may engage a first lateral side of each of the pelvic bolster assembly 25 and the thoracic bolster assembly 30. A second rail 20 may engage a second lateral side, opposite the first lateral side, of each of the pelvic bolster assembly 25 and thoracic bolster assembly 30. The first rail 15 and second rail 20 may run substantially or entirely parallel with one another. Each of the pelvic bolster assembly 25 and thoracic bolster assembly 30 may be more simply referred to as a "bolster assembly 25" and "bolster assembly 30" or as "bolster assemblies 25 and 30." The pelvic bolster assembly 25 may be configured to support at least a portion of a pelvis of a patient, while the thoracic bolster assembly 30 may be configured to support at least a portion of a chest or thoracic region of a patient when the patient is in the prone position.

Figure 6:
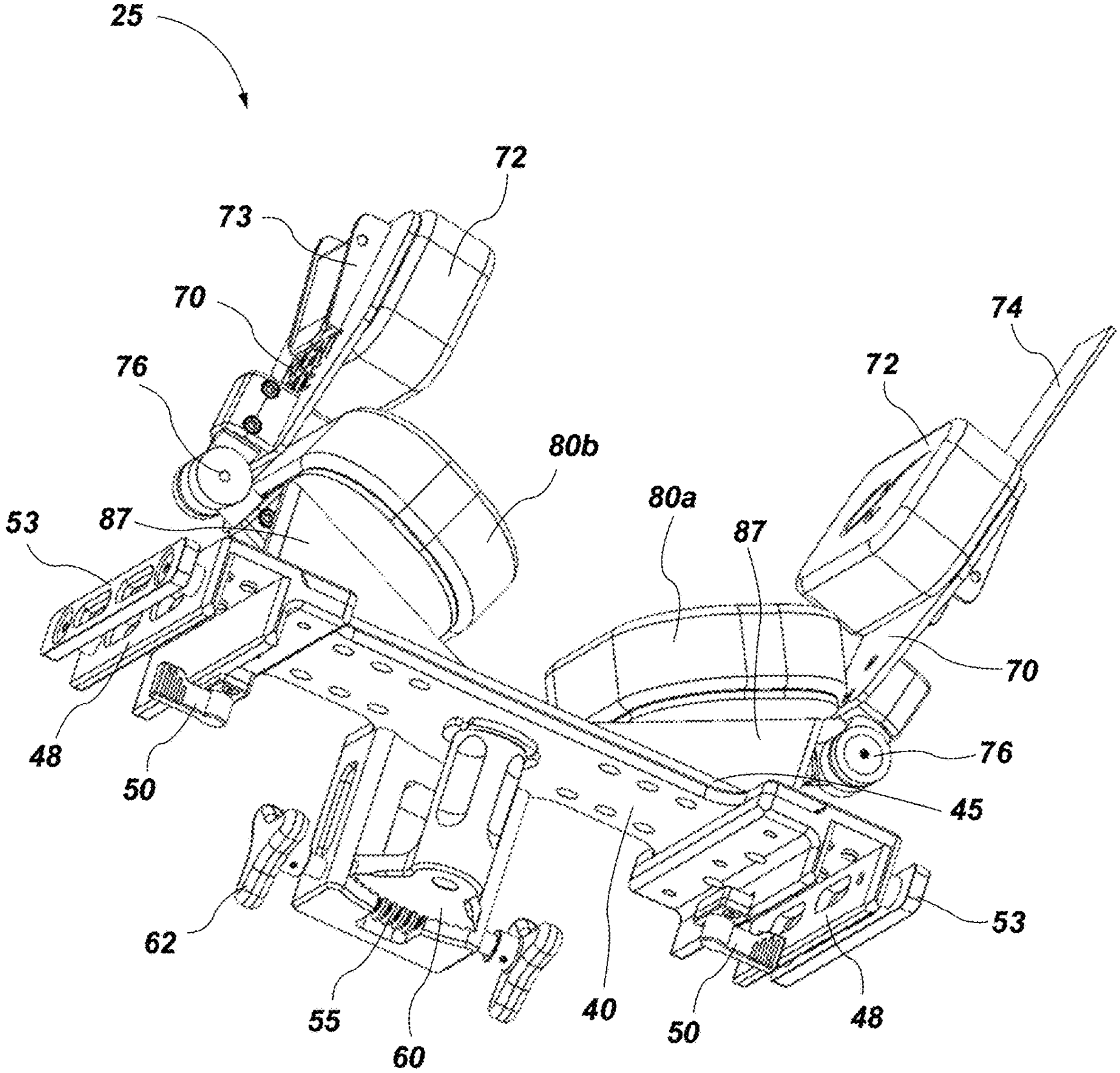
FIG. 6 is a bottom perspective view of a pelvic bolster assembly of the patient positioning system of FIG. 1.
Figure 7:
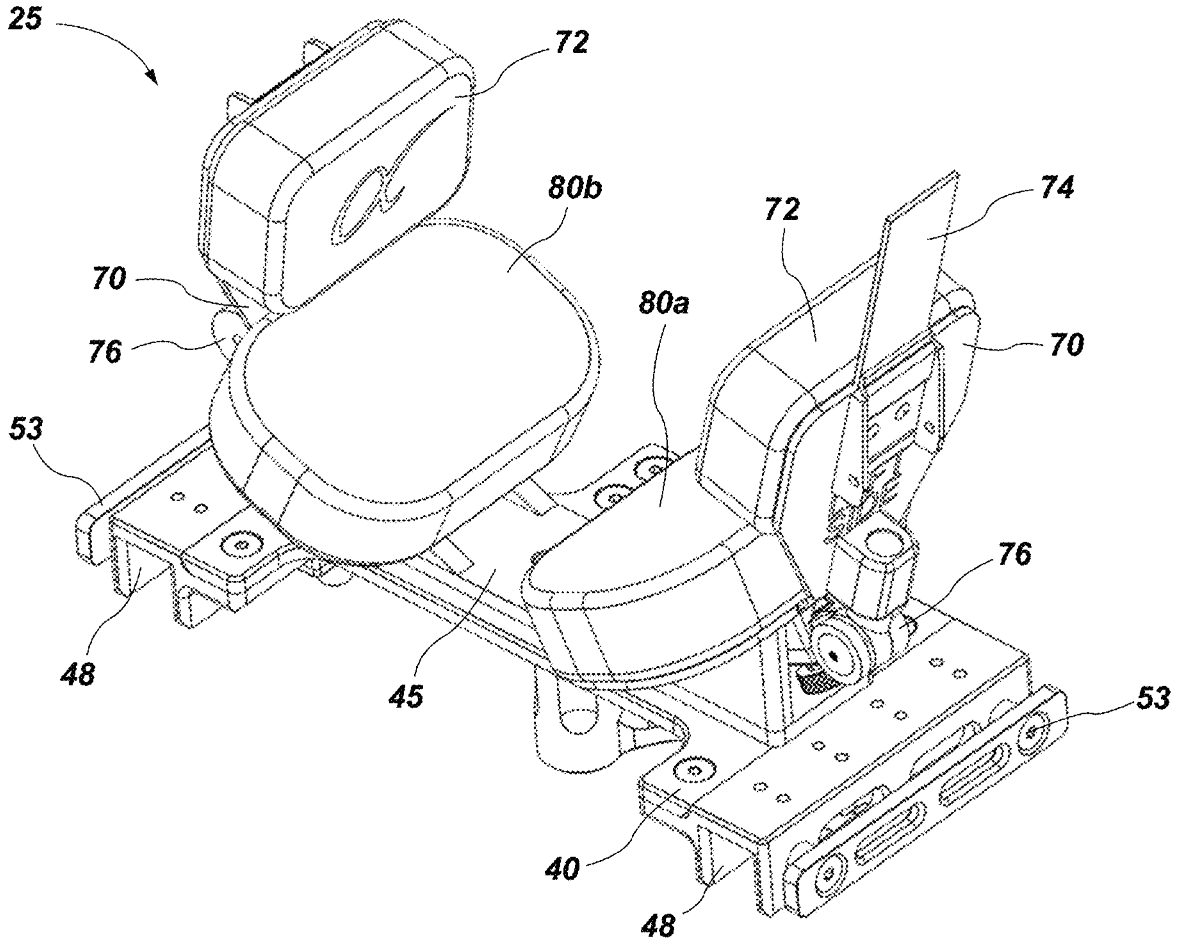
FIG. 7 is a top perspective view of a pelvic bolster assembly of the patient positioning system of FIG. 1.

One or more of the pelvic bolster assembly 25 and thoracic bolster assembly 30 may comprise a base 35, the base 35 having a lower portion 40 and an upper portion 45 (as seen more clearly in FIG. 6). The pelvic bolster assembly 25 may support the pelvis of a patient, and the thoracic bolster assembly 30 may support a chest of a patient. The upper portion 45 of one or more of the bolster assemblies 25, 30 may be pivotably connected to the base 35 such that the upper portion 45 is rotatable relative to the base 35 (see FIG. 3, and described in more detail below) in a coronal plane.

Figure 2:
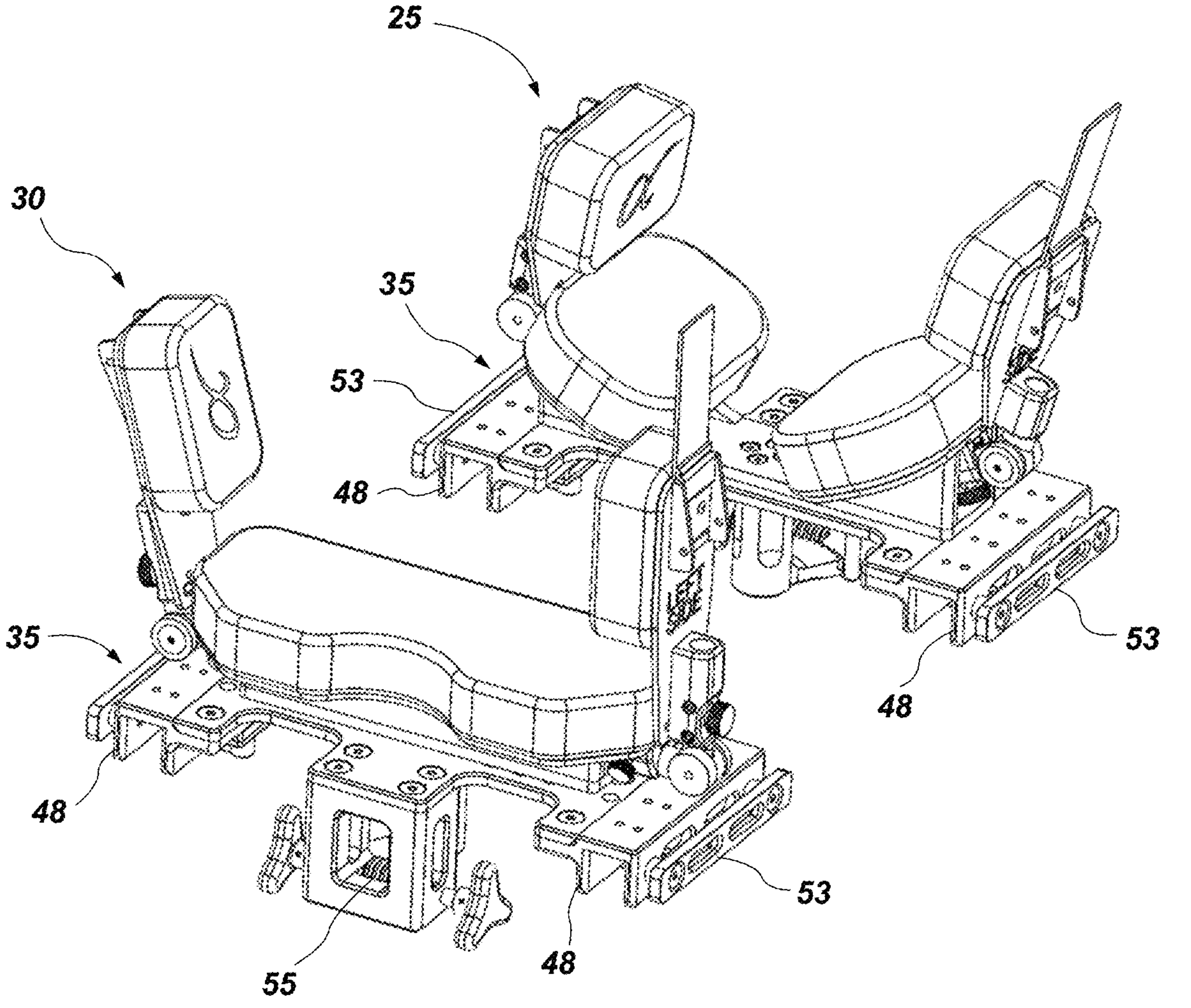
FIG. 2 is a front perspective view of the patient positioning system of FIG. 1.

Referring to FIG. 2, in some embodiments, the lower portion 40 of the base 35 of one or more of the bolster assemblies 25 and 30 may be provided with channels 48, which may be c-shaped channels or c-channels on each opposing lateral side. Alternative shapes and configurations could be used, such as a trapezoidal shape. In some cases, all that is required is that channels 48 have an open side for easy attachment to rails 15, 20. Channels 48 may comprise any number of geometries or shapes that allow the lower portion 40 of the base 35 to be mounted onto rails 15, 20 of a surgical frame bed as shown in FIG. 1. In some configurations, the c-channels 48 may be slidably connected to or mounted onto each of the rails 15, 20, so that the bolster assemblies 25, 30 may be longitudinally adjustable.

Although not illustrated, lower portion 40 may include one or more straps to secure cords or cables to prevent them from interfering with the surgery. Such straps may be Velcro straps located at each lateral side of lower portion 40, and each lateral side may include both caudal- and cephalad-positioned straps, which straps may be laced through two or more holes in lower portion 40.

Referring to FIGS. 4-8, one or more fasteners or locking mechanisms 50 (seen more clearly in FIG. 6) may be provided on one or both of the opposing lateral sides to lock the c-channel(s) 48 to the rail 15, 20. For example, a bolster assembly 25 and/or 30 may be placed on the opposing side rails 15, 20 of a surgical frame by placing the rails 15, 20 into the respective c-channel(s) 48 of the bolster assembly 25, 30. The c-channel(s) 48 may be selectively locked to the opposing side rails 15, 20 by engagement of the locking mechanism(s) 50. When the clinician desires to adjust the longitudinal position of a bolster assembly 25, 30 to custom-fit the needs of a particular patient, the locking mechanism 50 may be disengaged (for example, by rotation or other means), a clinician may slide the base of the bolster assembly 25, 30 longitudinally along the opposing side rails 15, 20, and then re-lock the c-channel 48 to the rails 15, 20 with locking mechanism 50. In some embodiments, sliding the base 35 of the bolster assembly 25, 30 longitudinally can be accomplished even while locking mechanism(s) 50 is locked. This may allow the clinician to longitudinally adjust the bolster assemblies 25 and/or 30 in positions suitable for a particular patient. The bolster assemblies 25, 30 may each be adjusted longitudinally with or without a patient being supported by the bolster assemblies 25, 30. That is, the bolster assemblies 25 and/or 30 may be adjusted while carrying a patient's weight during a surgical procedure.

In some configurations, the lateral sides of the lower portion 40 of the base 35 of one or more of the bolster assemblies 25 and 30 may also be provided with adapters 53 that can be used for table-mounted surgical accessories (such as retractor articulating arms, etc.). In the specific embodiment shown in FIGS. 1-3, adapters 53 are attached to the lateral sides of each of the c-channels 48. Adapters 53 may provide a convenient method for a clinician to attach table-mounted surgical accessories. In other configurations, adapters 53 may be provided only on one lateral side of the base 35 of one or more of the bolster assemblies 25 and 30, and in other configurations adapters 53 need not be provided. As another alternative, adapters 53 may be provided in a plurality of different locations and configurations of one or more of the bolster assemblies 25, 30.

Figure 4:
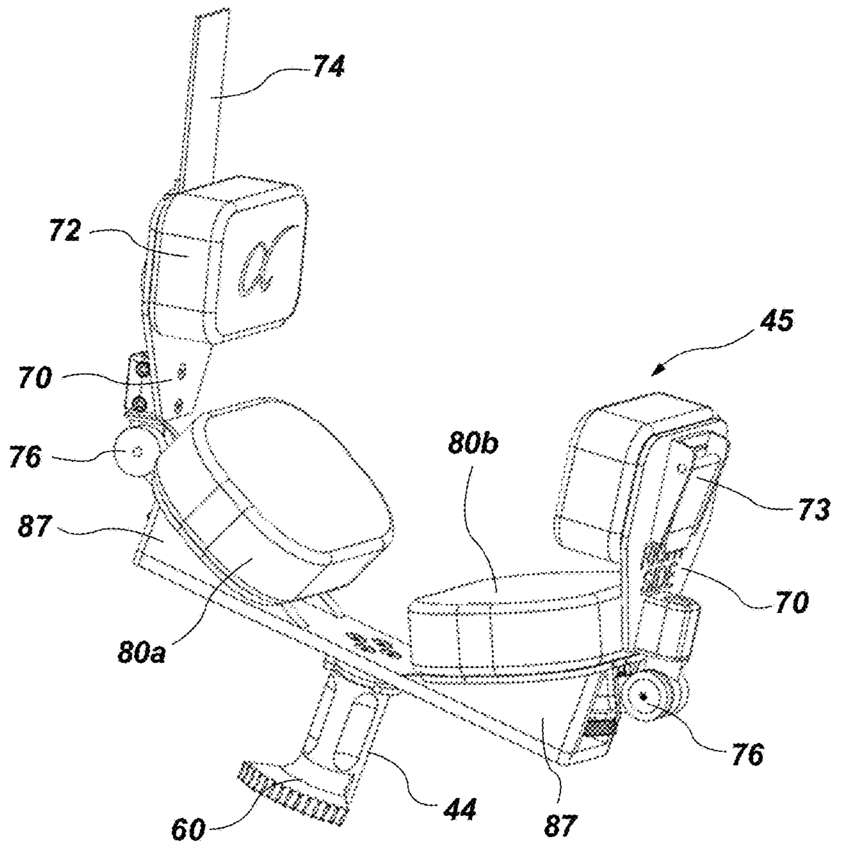
FIG. 4 is a perspective, rear view of the upper portion of a pelvic bolster assembly of the patient positioning system of FIG. 1.
Figure 5:
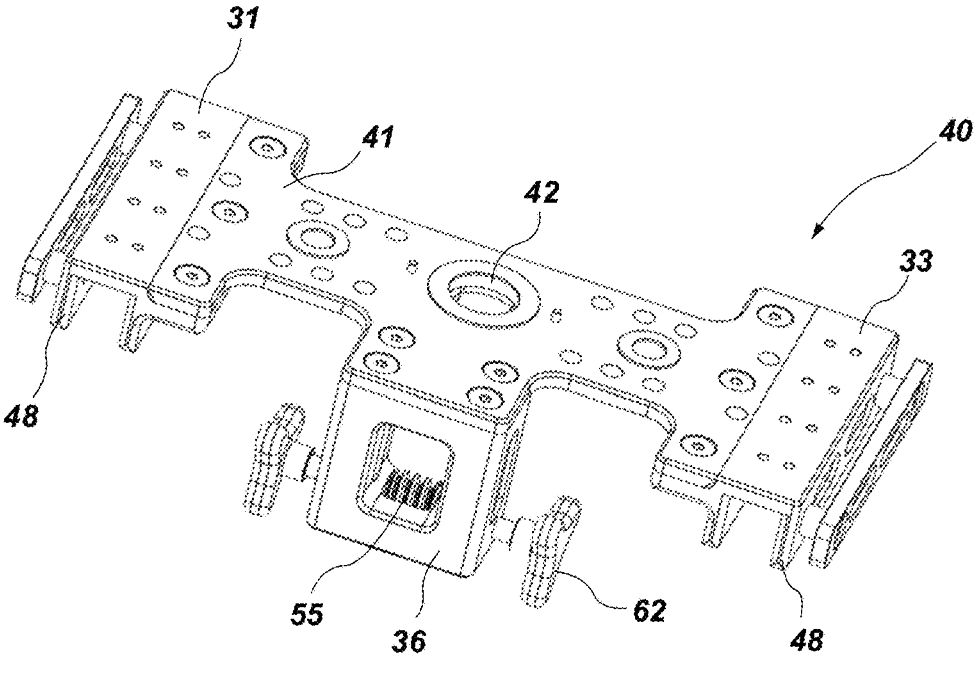
FIG. 5 is a perspective, rear view of the lower portion of a pelvic bolster assembly of the patient positioning system of FIG. 1.

Referring to FIG. 4 and FIG. 5, one or more of the bolster assemblies 25, 30 may be provided with an upper portion 45 of the base 35 that may be rotatably connected to the lower portion 40, such that the upper portion 45 may rotate relative to the lower portion in a coronal plane. The upper portion 45 may be connected to the lower portion 40, for example, via a worm drive. In some embodiments, a different drive mechanism, such as rack and pinion, a hypoid, a spiral bevel gear, or another gear driven mechanism could be used in place of a worm drive. In some embodiments, the mechanism is manually operated, though in some embodiments, the mechanism is driven by an electric motor, which can be controlled with the push of a button or other actuator proximal to the patient and/or bolster assemblies 25, 30 or from a remote device. The worm drive may comprise a worm shaft 55 attached to the lower portion 40 of the base 35, and a worm wheel 60 attached to the upper portion 45 of the base 35, the worm wheel 60 coupled to the worm shaft 55. For example, the worm wheel 60 may be attached to (or formed integrally with) a shaft 44 that is connected to the upper portion 45 of the base 35, extends through a void 42 in the lower portion 40, and is then coupled to the worm shaft 55 of the lower portion 40. Worm wheel 60 may include a means for resisting motion along the longitudinal axis of worm shaft 55, such as a thrust bearing.

Figure 9:
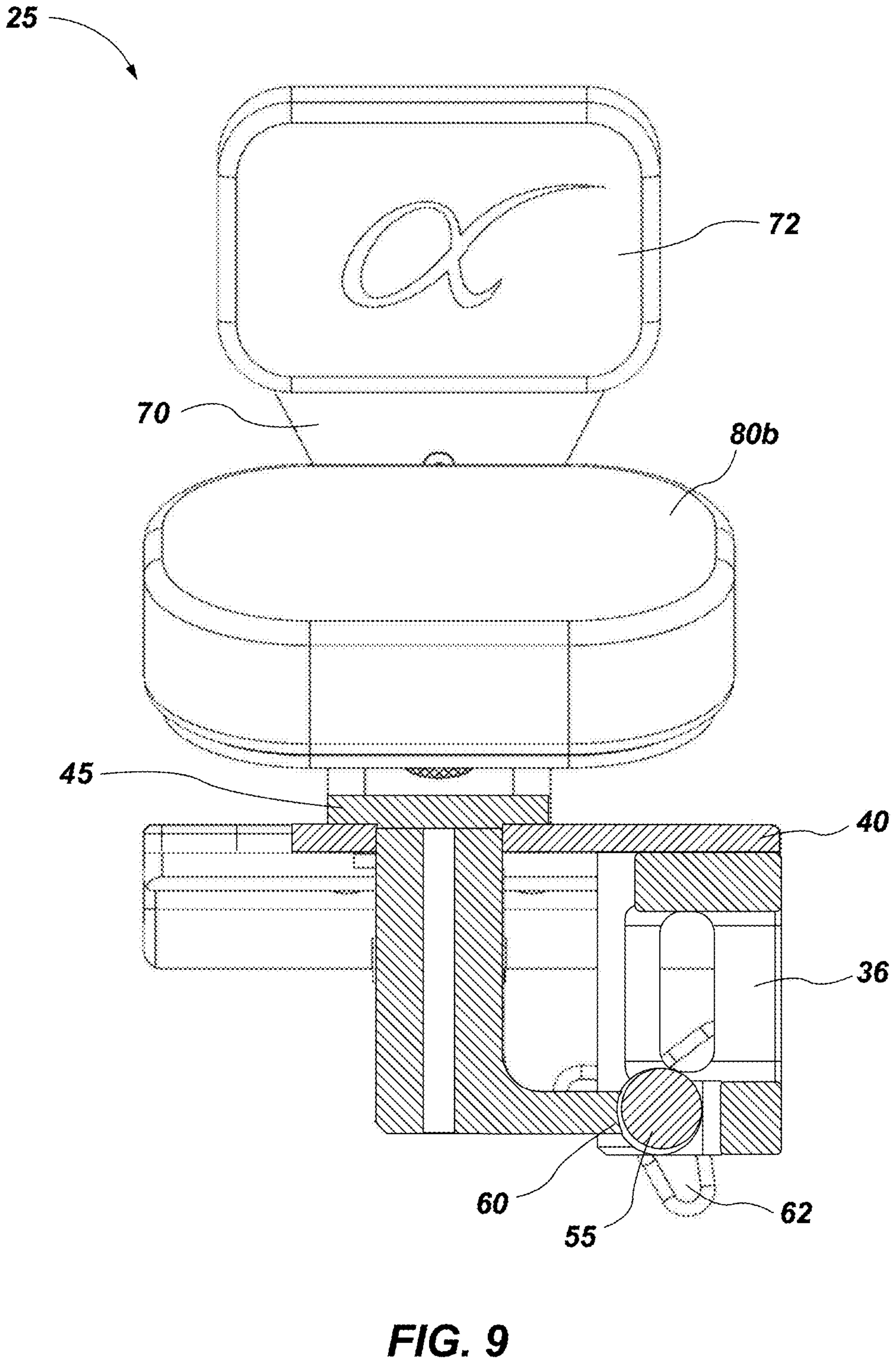
FIG. 9 is a cross-sectional view of a pelvic bolster assembly of the patient positioning system of FIG. 1.
Figure 10:
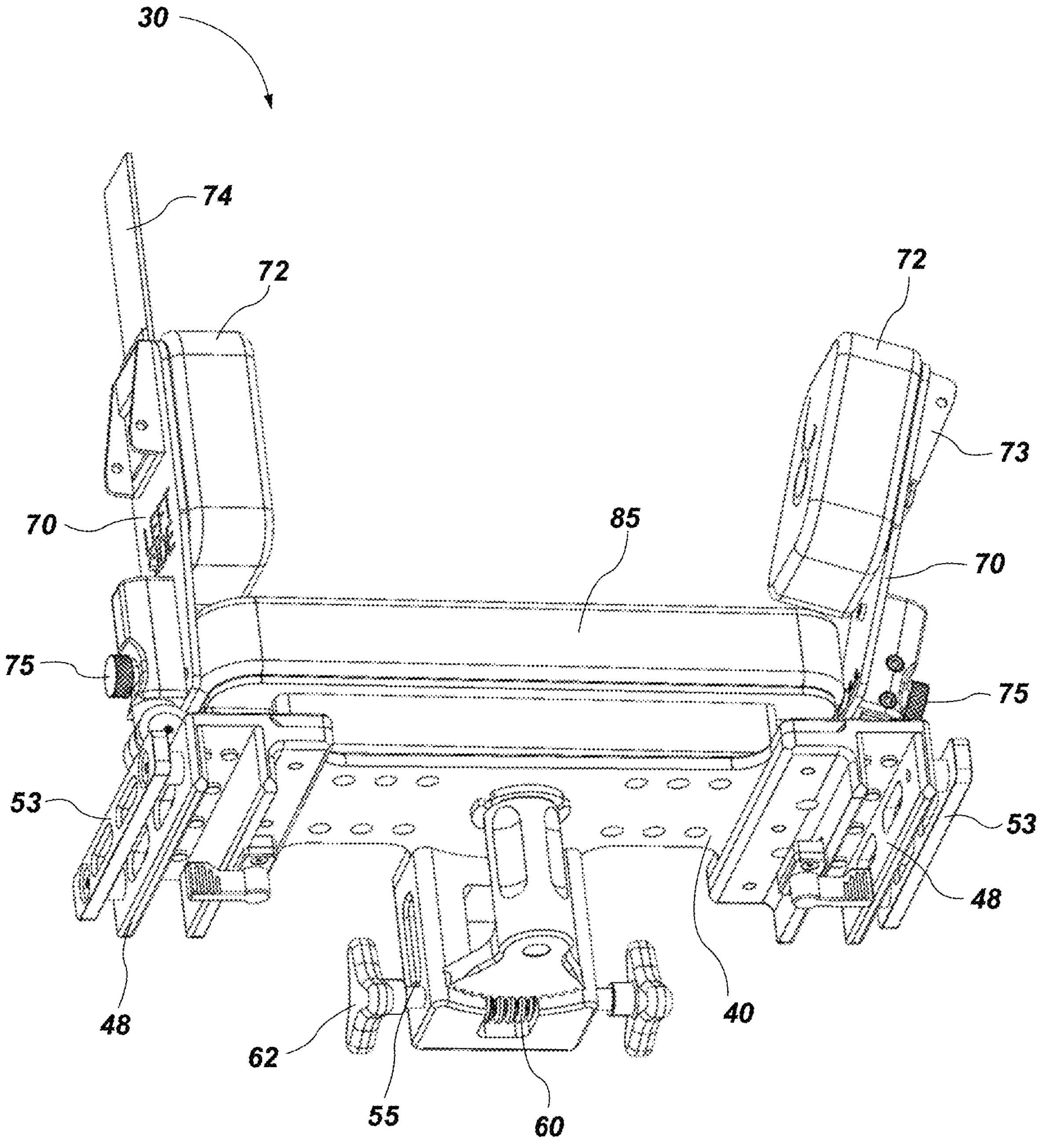
FIG. 10 is a bottom perspective view of a thoracic bolster assembly of the patient positioning system of FIG. 1.
Figure 11:
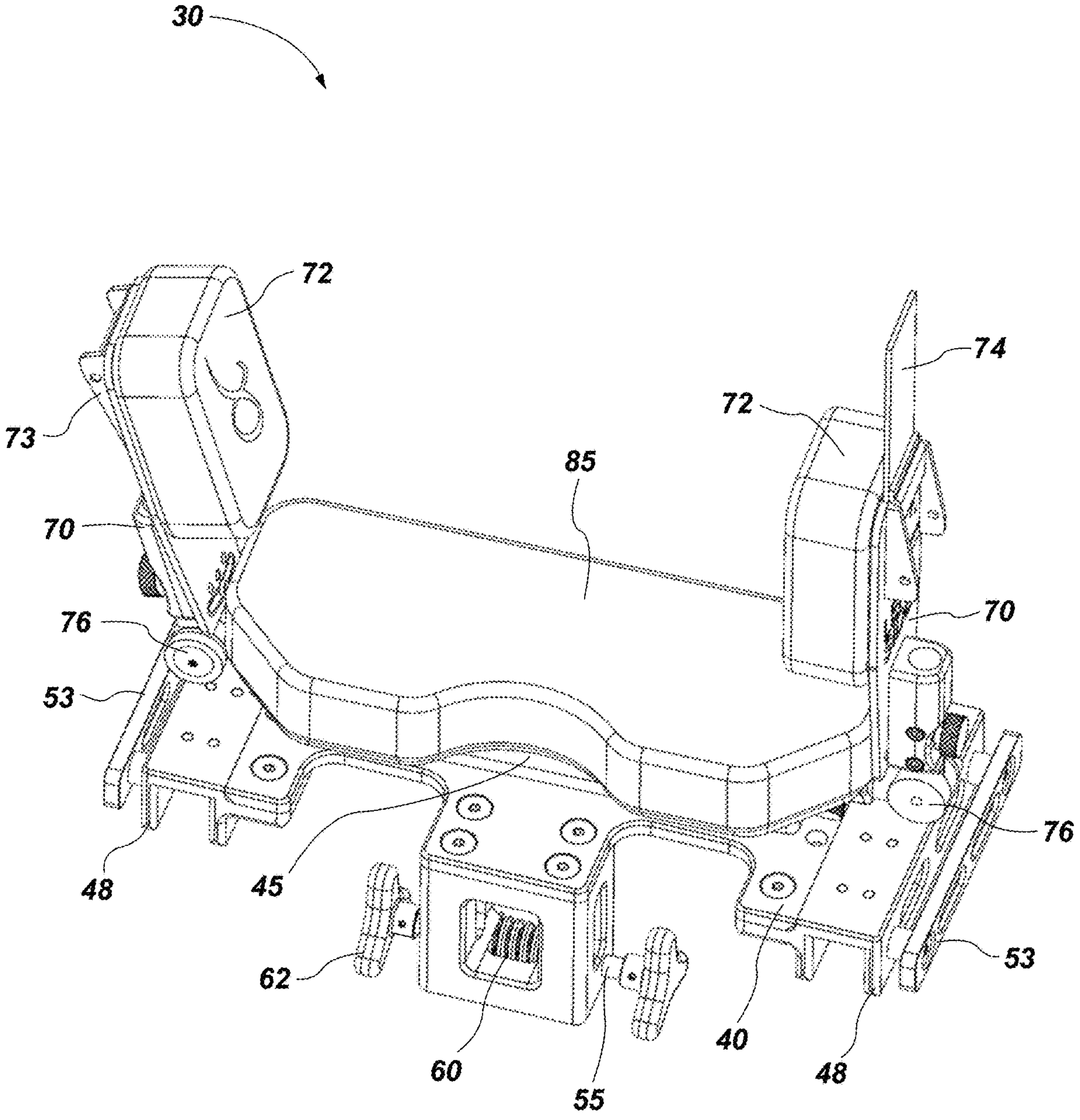
FIG. 11 is a top perspective view of a thoracic bolster assembly of the patient positioning system of FIG. 1.
Figure 13:
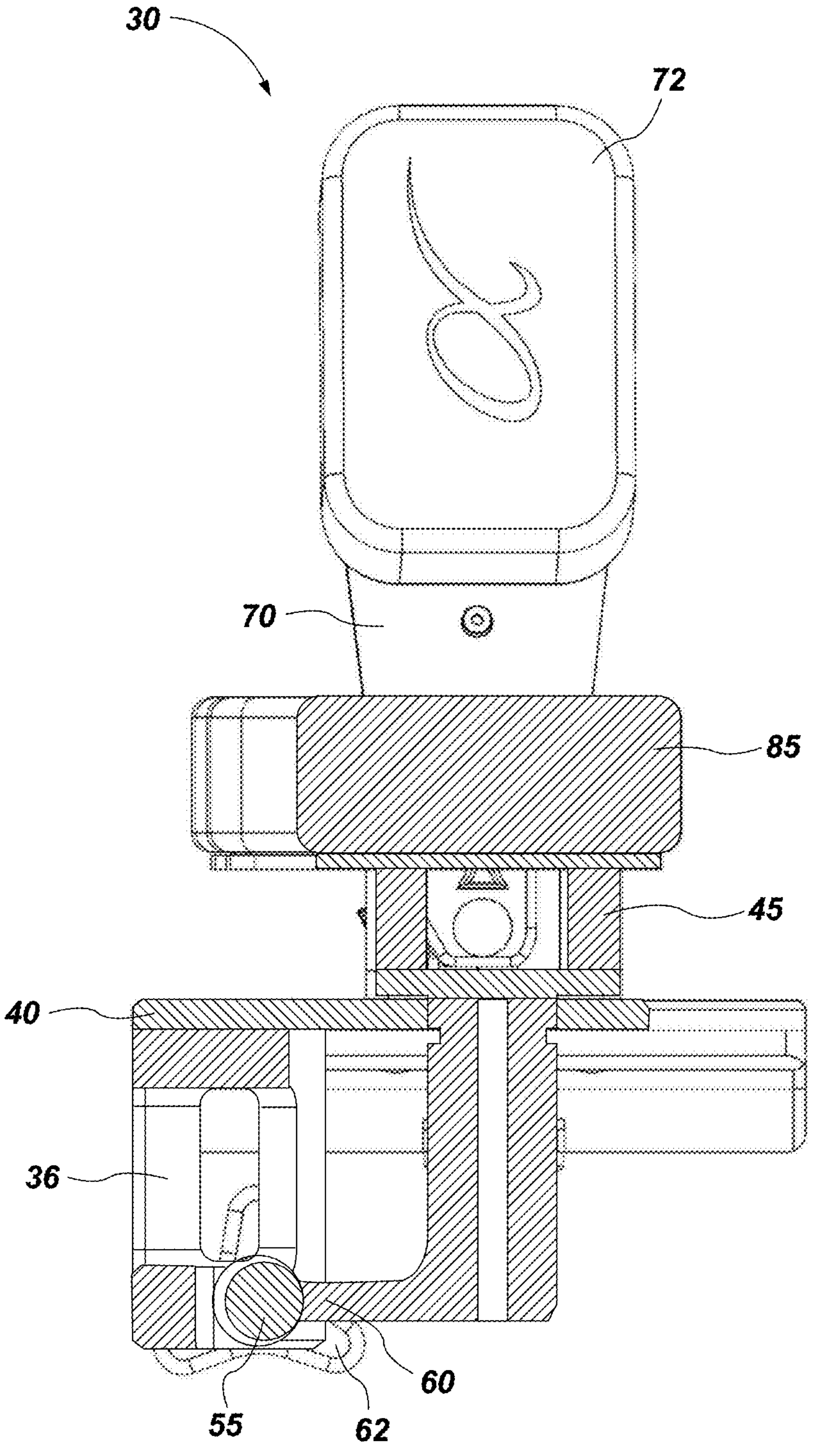
FIG. 13 is a cross-sectional view of a thoracic bolster assembly of the patient positioning system of FIG. 1.

The lower portion 40 may include a plate 41 extending between a first bracket 31 and a second bracket 33. The plate 41 may be secured by any means well known in the art such as screws, bolts, or the like allowing the plate 41 and brackets 31, 33 to sit flush along a top plane of the lower portion 40. The brackets 31, 33 may include the channels 48. The lower portion 40 may further include a boxed protrusion 36 extending in a direction opposite the upper portion 45, wherein the boxed protrusion 36 may maintain the worm shaft 55 (which may be more readily apparent in FIGS. 9 and 13).

Figure 3:
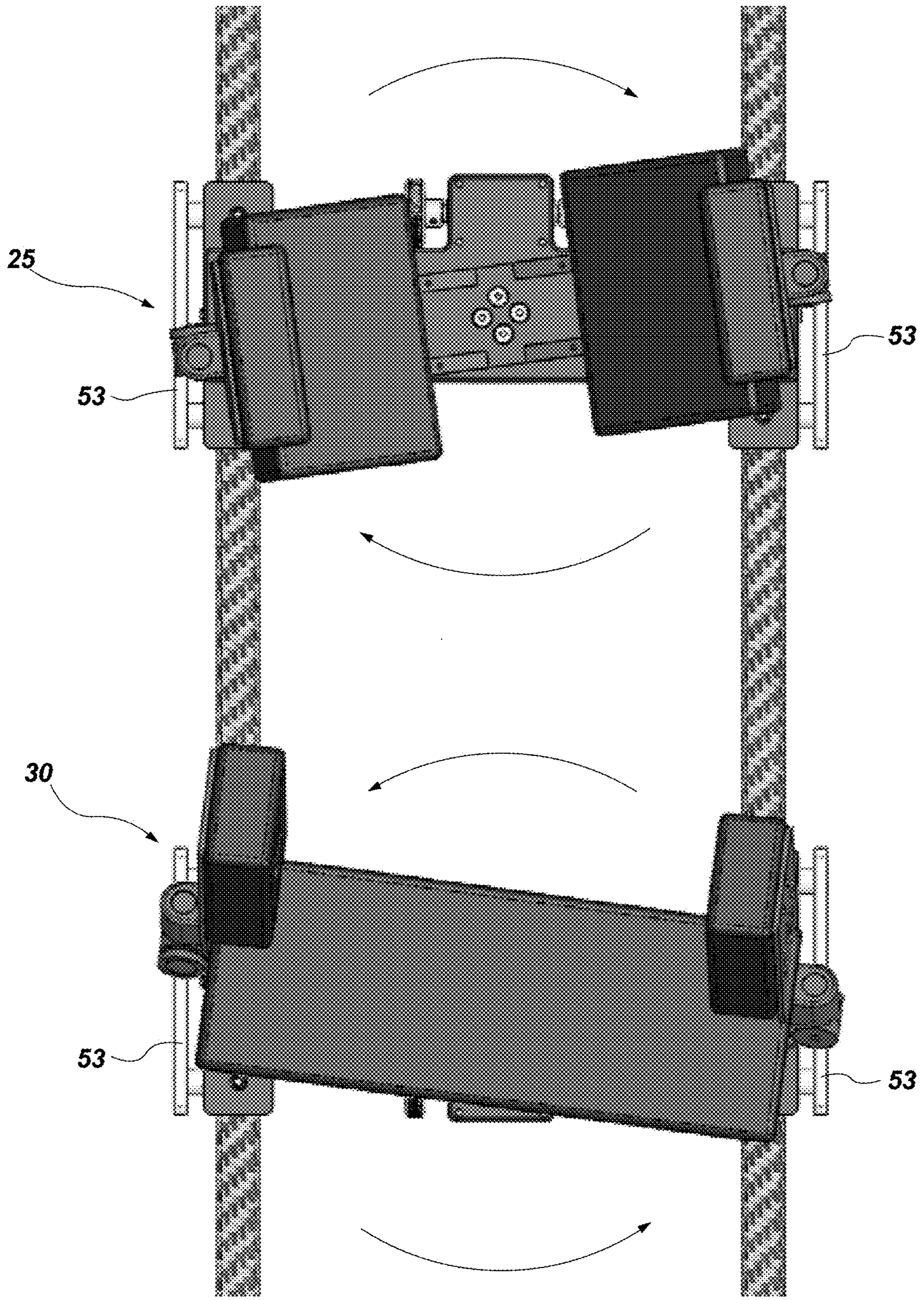
FIG. 3 is a top view of a patient positioning system.

In some configurations, the worm shaft 55 may have a coronal adjustment handle 62 provided to provide an easy method for a clinician to rotate the worm shaft 55 and thereby adjust the upper portion 45 of the base 35 in a coronal plane of the patient, or about a sagittal axis (arrows in FIG. 3 illustrate the rotation of the upper portion 45 to the lower portion 40). Other types of rotatable connections between the upper portion 45 and lower portion 40 may also be used.

The upper portion 45 of the base 35 may also have one or more lateral bolsters 70 attached thereto. In the specific, but non-limiting embodiment shown in FIG. 1, two lateral bolsters 70 are provided on each base 35 of the bolster assemblies 25, 30. Alternatively, one lateral bolster 70 may be provided, or lateral bolsters 70 may be provided only on the pelvic bolster assembly 25 or the thoracic bolster assembly 30. In other configurations (FIG. 18), lateral bolsters 70 may not be provided. In yet other embodiments, lateral bolsters may be provided on only one side of the bolster assemblies 30. The lateral bolsters 70 may be provided on opposing lateral sides of the upper portion 45 of the base 35.

In some configurations, the lateral bolsters 70 may be provided with one or more hinges 76 such that the lateral bolsters 70 may be adjusted as described in more detail below. Lateral bolsters 70 may also have one or more lateral pads 72 attached thereto. The lateral pads 72 may be comprised of a deformable material.

According to another aspect, one or more of the lateral bolsters 70 may be provided with a nylon strap 74, which may be permanently secured to the lateral bolsters or removable from the lateral bolsters 70. A material instead of nylon could be used for strap 74, though materials that are strong, supple, and comfortable for the patient may be preferred. An opposing lateral bolster 70 may be provided with a buckle 73 or other mechanism for receiving the nylon strap 74. The nylon strap 74 may be stretched across the patient's body to the opposing side, and buckled or otherwise attached. This may secure the patient to the bolster assemblies 25, 30 while providing additional support and stability during the procedure. It may also reduce and/or eliminate the need to use tape to assist in positioning and retaining the patient within the patient positioning system 10. In some embodiments, nylon strap 74 extends from one bolster 70 around the patient and around the entire bed and is secured to the original bolster 70. In some embodiments, nylon strap 74 extends from a first bolster 70, loops through a D-ring or similar structure on the second bolster 70, and is secured to the first bolster 70. Such a configuration allows nylon strap 74 to be used from one side of the bed.

Figure 8:
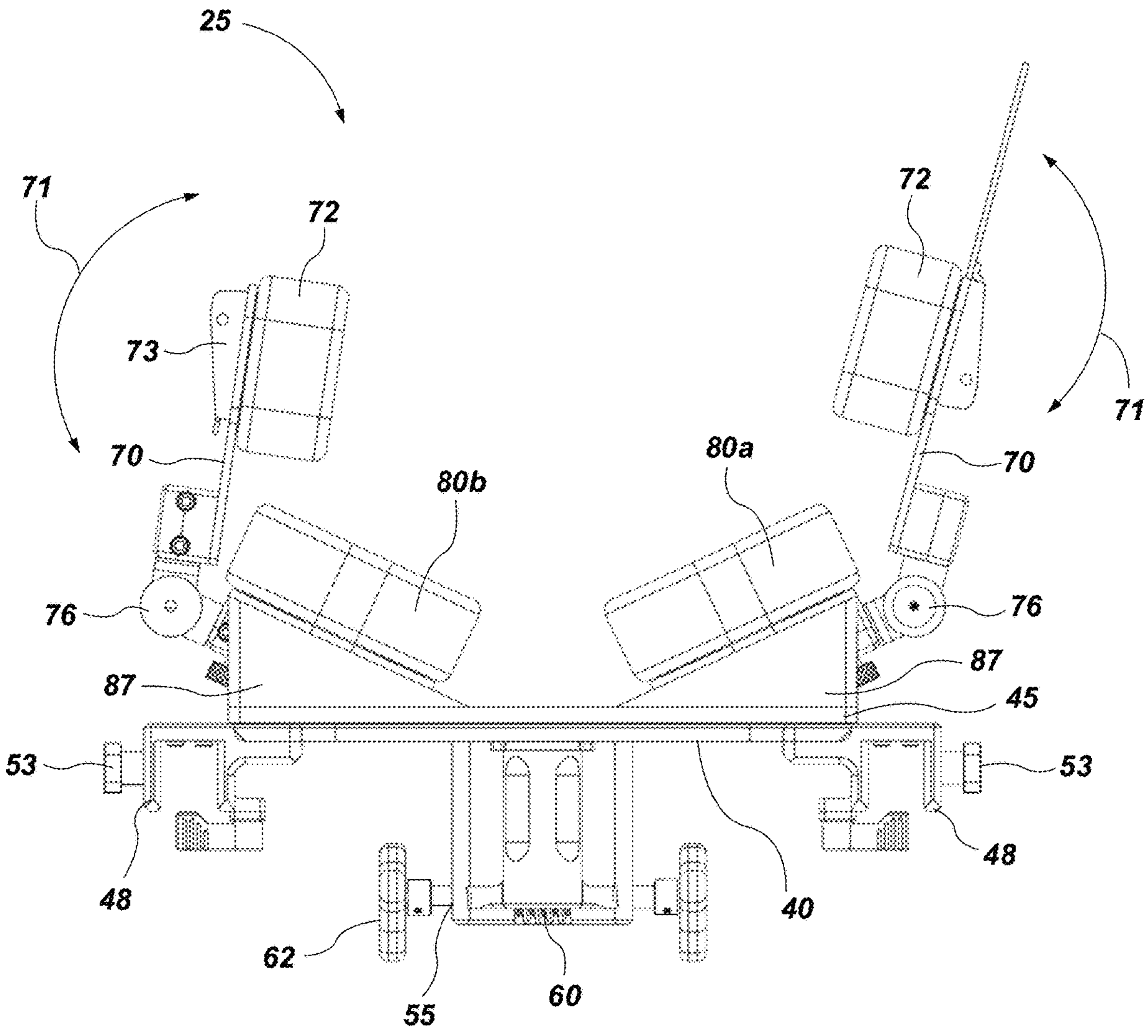
FIG. 8 is a side view of a pelvic bolster assembly of the patient positioning system of FIG. 1.
Figure 12:
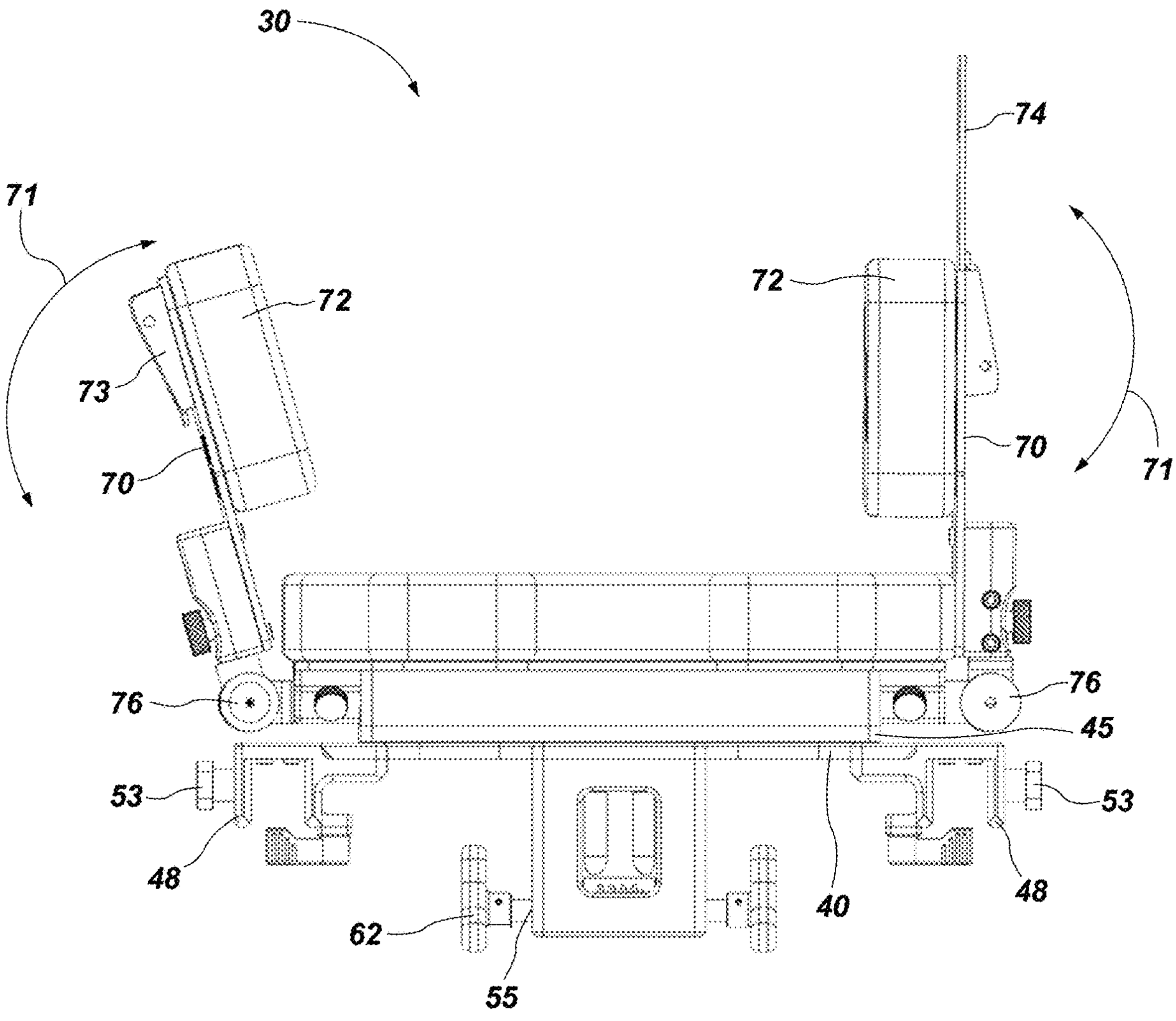
FIG. 12 is a side view of a thoracic bolster assembly of the patient positioning system of FIG. 1.

FIGS. 6-9 show detailed views of a pelvic bolster assembly 25 according to one specific, non-limiting example, and FIGS. 10-13 show detailed views of a thoracic bolster assembly 30 according to one specific, non-limiting example. According to one aspect, the lateral bolsters 70 on one or more of the bolster assemblies 25, 30 may be provided with one or more hinges 76 such that the lateral bolsters 70 may be adjusted. For example, the lateral bolsters 70 may be provided with one or more indexed locking hinge mechanisms and may be adjustable inwardly and outwardly in a transverse plane as desired (arrows 71 in FIGS. 8 and 12 show the adjustment of the lateral bolsters 70 of the pelvic bolster assembly 25, and similar adjustment may be found for the thoracic bolster assembly 30). These hinges 76 may be used to vary the amount of lateral compression by the lateral bolsters 70 on the patient as a function of the hinge angle. In some embodiments, the indexed locking hinge mechanism(s) may allow for adjustment of the lateral bolster(s) 70 from 0° to 180°, with various indexed positions, such as every 5 to 20 degrees. In a more specific configuration, the indexed positions may be provided every 10 degrees. In other configurations, a non-indexed locking hinge or other hinge may be provided allowing for an infinite number of positions.

Figure 14:
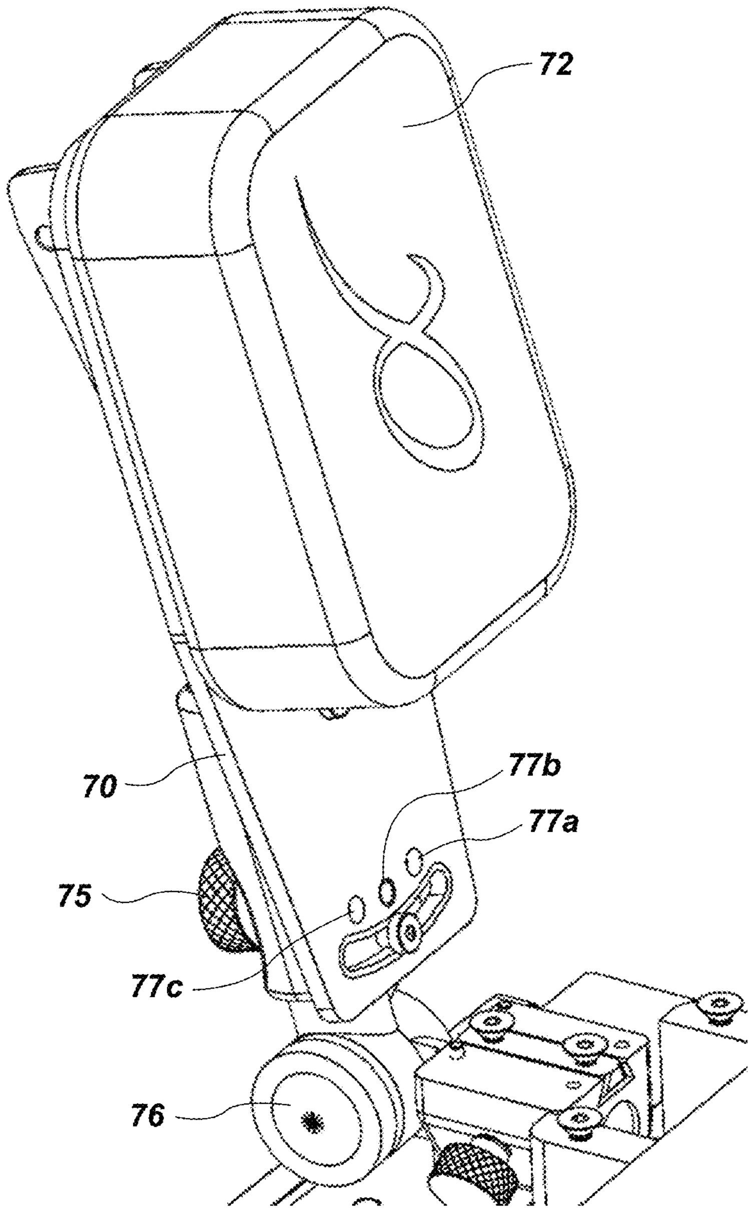
FIG. 14 is a partial perspective view of a lateral bolster of the thoracic bolster assembly of FIG. 13.
Figure 15:
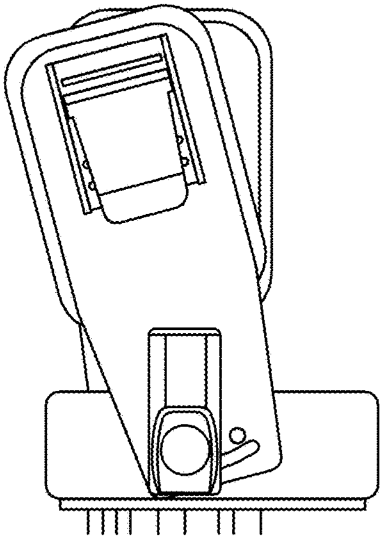
FIG. 15 is a side view of a lateral bolster of the thoracic bolster assembly of FIG. 13, showing the lateral bolster in a caudal/inferior position.
Figure 16:
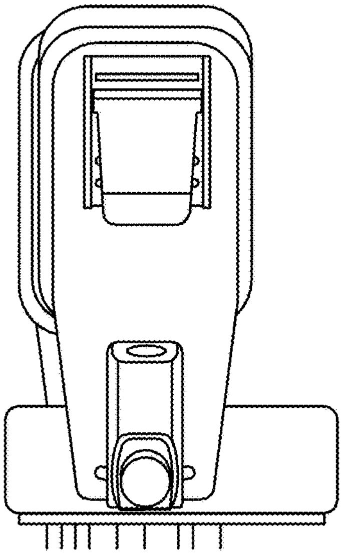
FIG. 16 is a side view of a lateral bolster of the thoracic bolster assembly of FIG. 13, showing the lateral bolster in a vertical position.
Figure 17:
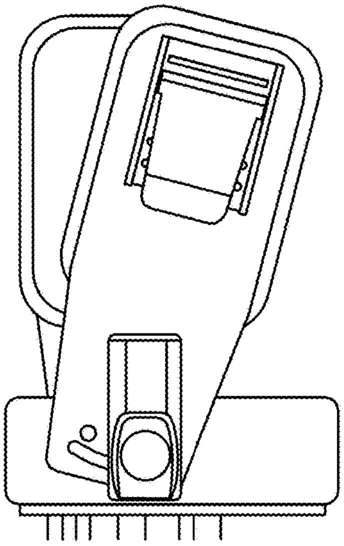
FIG. 17 is a side view of a lateral bolster of the thoracic bolster assembly of FIG. 13, showing the lateral bolster in a cranial/superior position.

According to another aspect, one or more of the lateral bolster(s) 70 on one or more of the bolster assemblies 25, 30, may be adjustable in a sagittal plane. For example, in the configuration shown in FIGS. 10-13, each of the lateral bolsters 70 of the thoracic bolster assembly 30 are provided with adjustment mechanisms such that they may be adjusted both in a sagittal and a transverse plane via one or more locking adjustable hinges 75. The sagittal plane adjustment may be accomplished by any suitable adjustment means. For example, as shown in the perspective view of a lateral bolster 70 of the thoracic bolster assembly 30 in FIG. 14, an arced cut-out passing transversely through the lateral bolster 70, the arced cut-out having a radius of curvature, may be formed in the lateral bolster 70 to provide a pivoting support. In this particular, non-limiting example, three positions are provided: caudal/inferior **77*c* (FIG. 15), vertical 77*b* (FIG. 16), and cranial/superior 77*a* (FIG. 17**); however, it is contemplated that an infinite number of positions may be used without specific predetermined locations.

According to another aspect, each of the bolster assemblies 25, 30, may be provided with one or more support pads attached to the upper portion 45 of the base 35, such that the support pads are affixed to the rotating upper portion 45. The pelvic bolster assembly 25 may comprise a pelvic support pad 80 attached to the upper portion 45 of the base 35 of the pelvic bolster assembly 25, and the thoracic bolster assembly 30 may comprise a thoracic support pad 85 attached to the upper portion 45 of the base 35 of the thoracic bolster assembly 30. In the specific, non-limiting embodiment shown in FIG. 6, the pelvic bolster assembly 25 includes two pelvic support pads **80*a*, 80*b* attached to the upper portion 45 of the base 35**. In other configurations, a single pelvic support pad may be used, or three or more pelvic support pads may be provided.

Any of the pads discussed herein may be designed to achieve an overhang relative to whatever surface supports the pad. Such an overhang reduces contact between a patient and any non-padded surfaces of patient positioning system 10. The overhang may be anywhere from about 0.5 cm to about 5 cm, from about 1 cm to about 4 cm, or from about 1.5 cm to about 3 cm.

According to another aspect, each of the bolster assemblies 25, 30 may have adjustable lengths. Although not illustrated, one or both bolster assemblies 25, 30 may be formed of two sliding plates, with lateral support pads 72 secured to one plate and the other plate secured to hinge 76. In this manner, the two plates allow for the height or length of the bolster assemblies 25, 30 to be adjusted as needed depending on a clinician's needs.

In some configurations, the pelvic bolster assembly 25 may include one or more gussets or brackets 87 (as seen more clearly in FIG. 4) upon which the pelvic support pads **80*b* may be placed. The gusset 87 may provide an angular support for the support pads 80*b* and assist in positioning a portion of the pelvis of the patient in a prone position. The gusset 87 may provide any desired angle for positioning the support pads 80*a*, 80*b* and in some configurations, the gusset 87 may provide angular support for an angle of about to about 45°. More particularly, the gussets 87** may provide angular support for an angle of about 20° to about 30°.

Figure 18:
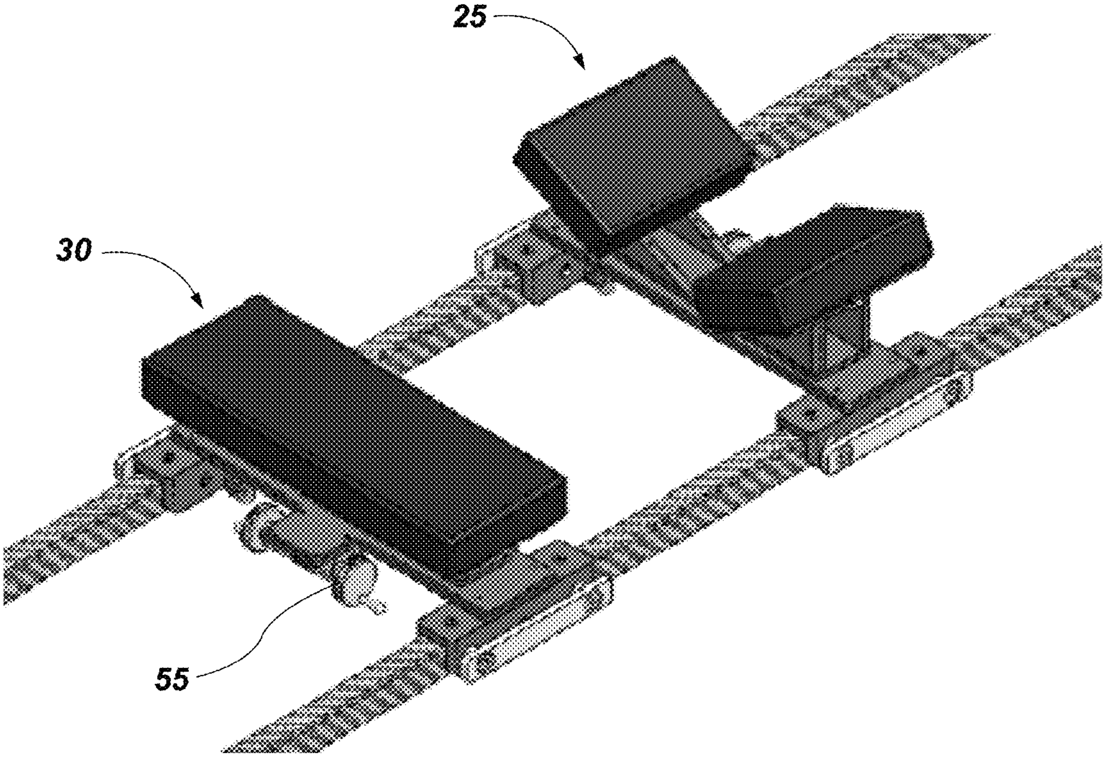
FIG. 18 is a perspective view of another configuration of a patient positioning system.
Figure 19:
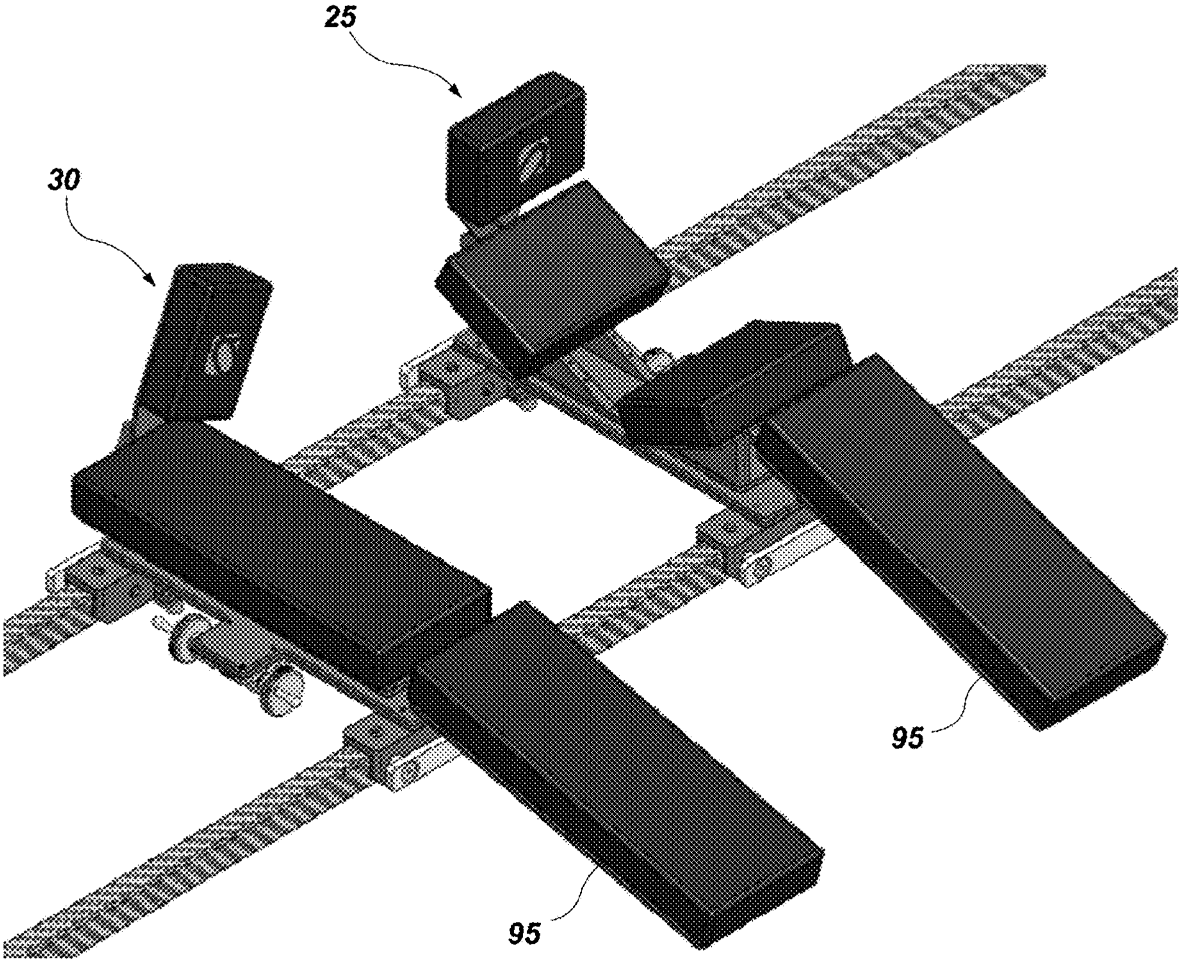
FIG. 19 is a perspective view of another configuration of a patient positioning system.
Figure 20:
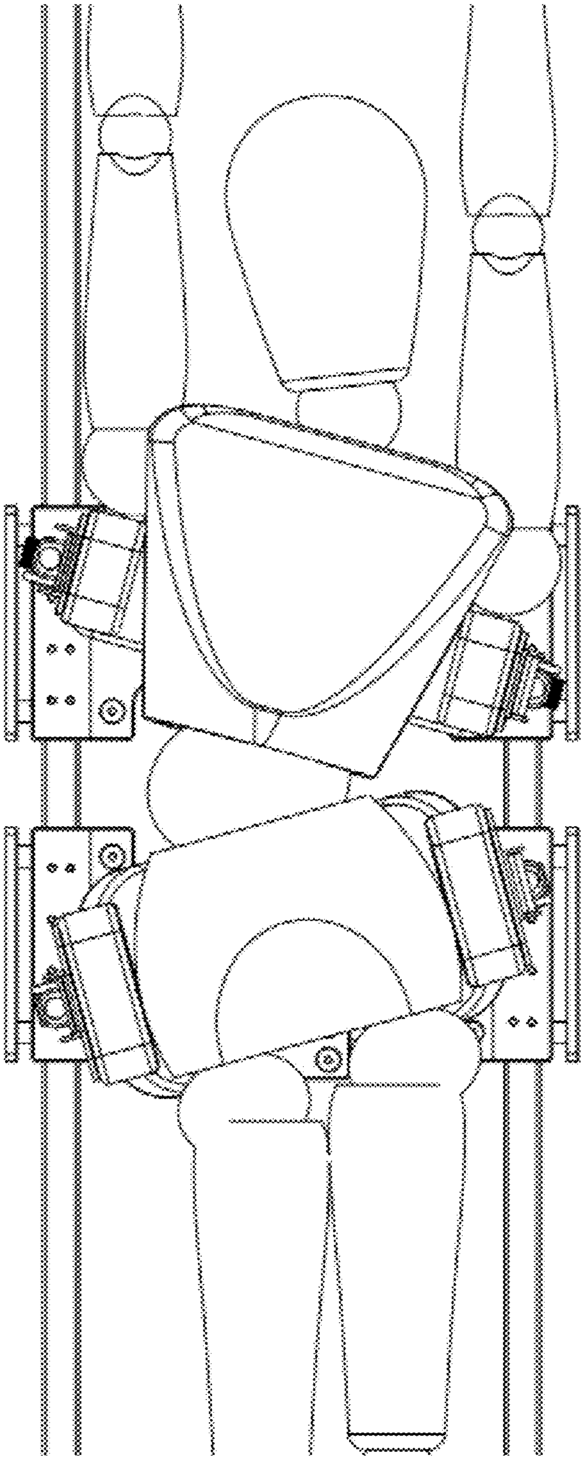
FIG. 20 is a top view of a patient positioning system showing a patient in place on the system.

Referring to FIGS. 18 and 19, according to yet another aspect, one or more of the lateral bolsters 70 may be removable. This may allow, for example, one or more patient safety loading ramps 95 to be attached to the base 35 of the bolster assemblies 25, 30. The patient safety loading ramps 95 may be inserted into the upper portion 45 of the base 35 in a similar manner to the lateral bolsters 70. For example, when a patient is to be transferred, a clinician may first remove the lateral bolsters 70 on the left side of each of the bolster assemblies 25, 30. The clinician may then attach the patient safety loading ramps 95 and proceed to transfer the patient. After the patient is loaded, the clinician may then remove the patient safety loading ramps 95 and replace the lateral bolsters 70 on the left side of each of the bolster assemblies 25, 30.

According to another aspect, one or more components of the patient positioning system may be formed of a radiolucent material, such as carbon fiber, and/or polymer materials that are not only radiolucent but may also reduce the weight of the patient positioning system 10, thereby making the system 10 easier to install, remove, and/or manipulate. This may allow x-rays to be taken intraoperatively without components of the patient positioning system 10 blocking the patient in the x-ray image. In some embodiments, radiolucent materials are combined with radiopaque materials where the improved strength of the radiopaque material is desired. For example, in some embodiments, worm wheel 60 includes a metal insert to provide teeth that are sufficiently strong. In some embodiments, the location of the radiopaque materials minimizes the impact such materials have on x-ray images. For example, in some embodiments, worm wheel 60 is positioned on support assembly so as to be outside of the x-ray window, e.g., below S1-L5, so as to not interfere with a clinician's visualization of that section of the patient's spine. In some embodiments, the worm gear assembly comprising worm shaft 55 is positioned laterally so as to be outside the x-ray window.

According to another aspect of the present disclosure, the component parts of a patient positioning system 10 may be replaceable. For example, stress on certain components may cause uneven wear over time or even failure of one or more of the components. In some embodiments, one or more of the worm shaft 55 or worm wheel 60 may be replaced without the need to replace the entire patient positioning system 10. Similarly, in some embodiments, covers may be provided for one or more of the lateral bolsters 70, the pelvic support pad(s) 80, and/or the thoracic support pad 85. Such covers may be disposable, one-time use covers, or washable, re-useable covers. In some embodiments, one or more of pelvic support pad(s) 80, thoracic support pad 85, and lateral support pads 72 are replaceable and may be releasably secured to the patient support system 10 by an attachment means, such as Velcro.

According to another aspect, the patient support system 10 may be adjusted while the patient is on the support system 10 or when the support system 10 is supporting the weight of the patient. That is, the patient support system 10 may be adjusted intraoperatively. The support system 10 may also be adjusted without a patient on the support system 10.

As an example of a patient support technique, a patient may first be placed in a prone position, with the chest of the patient supported substantially by the thoracic support pad 85 of the thoracic bolster assembly 30. Similarly, the pelvis of the patient may be supported substantially by one or more pelvic support pads **80*a*, 80*b* of the pelvic bolster assembly 25. After placing the patient in the prone position on the bolster assemblies 25, a clinician may then adjust the bolster assemblies 25, 30, as needed. Referring to FIG. the clinician may rotate the upper portion 45 of the base 35 of one or more of the bolster assemblies 25, 30, relative to the lower portion 40, in a coronal plane of the patient. This rotation may significantly improve access to the spine of the patient for surgery. Similarly, the clinician may adjust one or more of the lateral bolsters 70 in a transverse plane to achieve bilateral compression. If needed, the clinician may also adjust the lateral bolsters 70 of the thoracic bolster assembly 30** in a sagittal plane.

Other methods of adjustment may also be used. Adjustment may be conducted with one or both of the pelvic and thoracic bolster assemblies 25, 30. After the bolster assemblies 25, 30 are adjusted as desired, a clinician may further secure the patient using one or more strap(s) 74. After a patient is secured, a surgical frame may be rotated about a longitudinal axis. This may further improve access to the spine of the patient for surgical procedures. According to another aspect, the patient positioning system 10 may also provide options for translational movement of the patient.

The translational movement may be distinct and independent of the rotational movement of the patient in the coronal plane.

Figure 21:
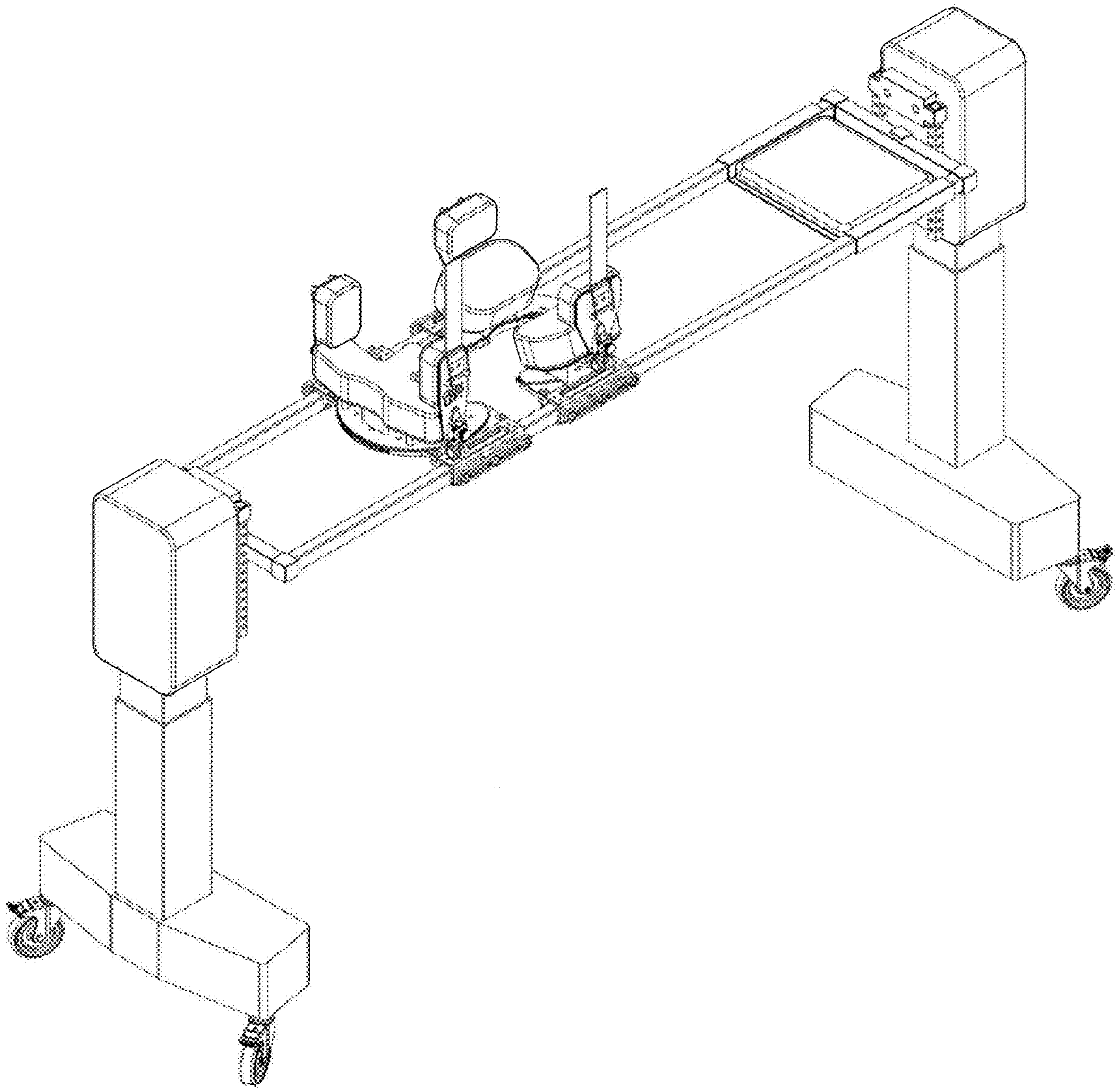
FIG. 21 is a perspective view of another embodiment of a patient positioning system positioned on a surgical frame.
Figure 22:
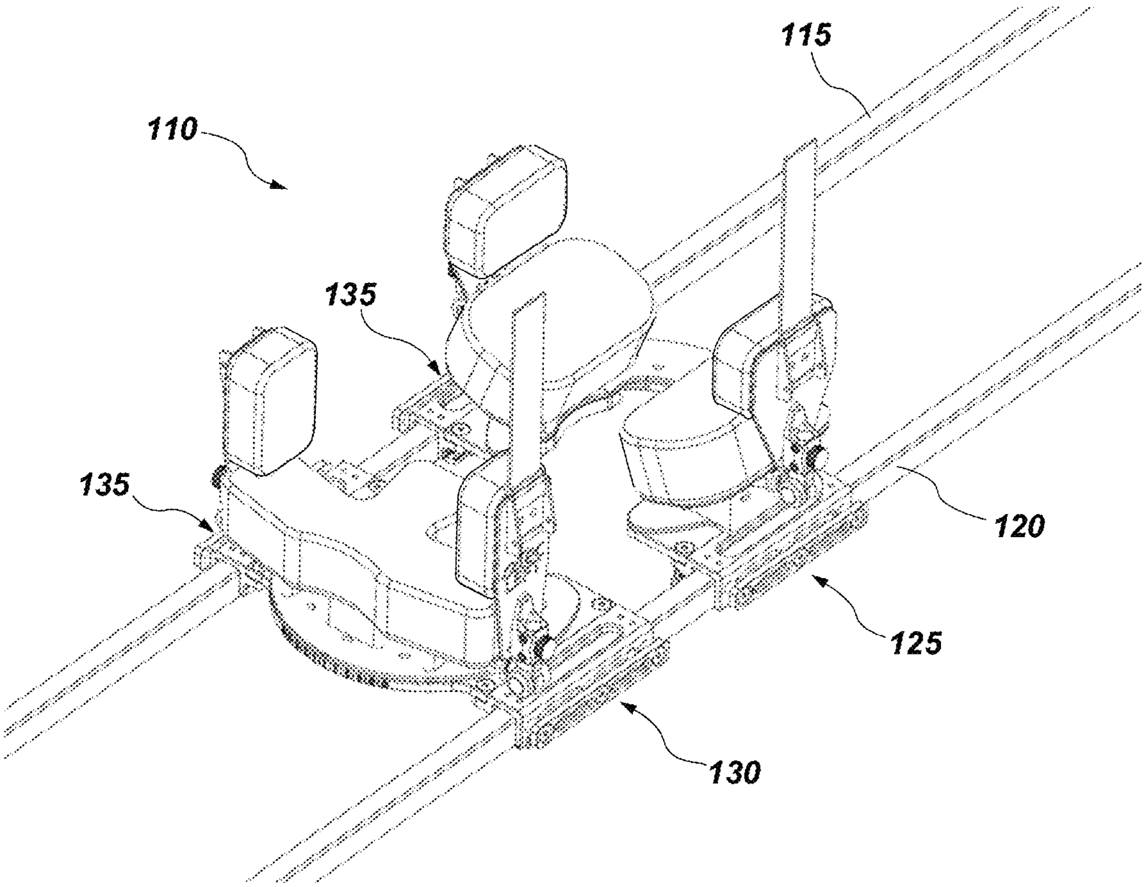
FIG. 22 is a perspective view of the embodiment of the patent positioning system of FIG. 21.

FIG. 21 shows a perspective view of another configuration of a patient positioning device, with the device shown in place on an exemplary surgical frame. FIGS. 22 through 25 detail this other configuration of a patient positioning device, generally indicated at 110. Similar to the embodiment discussed above, the patient positioning system 110 may generally include a pelvic bolster assembly 125 and a thoracic bolster assembly 130. A first rail 115 (such as a rail of a standard Jackson frame surgical table frame or any other suitable surgical table or surgical table frame) may engage a first lateral side of each of the pelvic bolster assembly 125 and the thoracic bolster assembly 130. A second rail 120 of a surgical table may engage a second lateral side, opposite the first lateral side, of each of the pelvic bolster assembly 125 and thoracic bolster assembly 130. The pelvic bolster assembly 125 may be configured to support at least a portion of a pelvis of a patient, while the thoracic bolster assembly 130 may be configured to support at least a portion of a chest or thoracic region of a patient when the patient is in the prone position.

Figure 28:
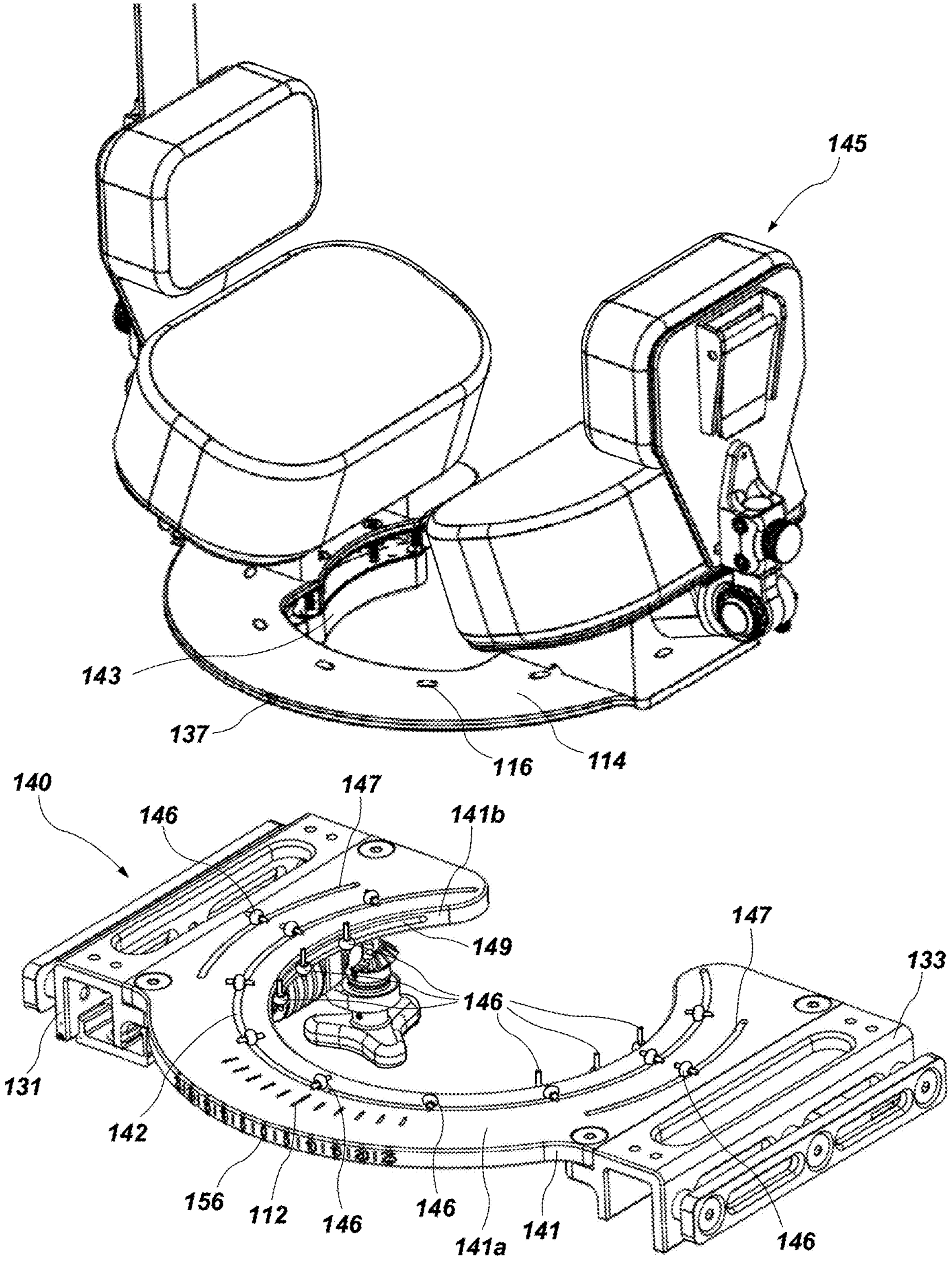
FIG. 28 is a partially exploded view of a pelvic support as described herein.

One or more of the pelvic bolster assembly 125 and thoracic bolster assembly 130 may comprise a base 135, the base 135 having a lower portion 140 and an upper portion 145 (as seen more clearly in FIG. 28). As seen most easily in the bottom view of FIG. 25, each of the lower portion 140 and upper portion 145 of the base 135 of each of the pelvic bolster assembly 125 and the thoracic bolster assembly 130 has a generally U-shape, horseshoe shape, or semi-circular shape. This shape may radiographically open up the sagittal plane of the patient, and allow the sagittal plane to be fairly unobstructed which may be desirable for imaging and/or access during spinal surgery. Additionally, one or more of the lower portion 140 and upper portion 145 may be made partially or entirely of radiolucent materials, such as carbon fiber. In other configurations, the base 135 may be other suitable shapes and/or sizes.

In some embodiments, the base 135 of the pelvic bolster assembly 125 is U-shaped, horseshoe-shaped, or semi-circular-shaped while the base 135 of the thoracic bolster assembly 130 is rectangular in shape and may have a cranial-caudal length that is less than the cranial-caudal length of the pelvic bolster assembly 125.

Similar to the embodiments described above, the lower portion 140 of the base 135 of one or more of the bolster assemblies 125 and 130 may be provided with channels 148 with an open side for connection to a rail 115, 120 of a surgical table. The channels 148 may be integral to the lower portion 140 of the base 135, or they may be connected to the lower portion 140 of the base 135. Any suitable shape and size may be used for the channels 148, and c-channels are shown in this specific configuration. The c-channel structure may also include one or more additional vertical supports for a handle for rotation of the upper portion 145, as discussed in more detail below. In other configurations, the vertical support for the handle need not be provided.

Figure 26A:
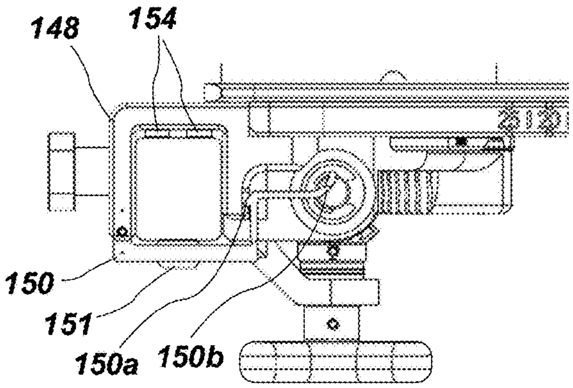
FIG. 26*a* is a close-up detailed view of a channel and locking mechanism as described herein, with the locking mechanism in a closed position.
Figure 26B:
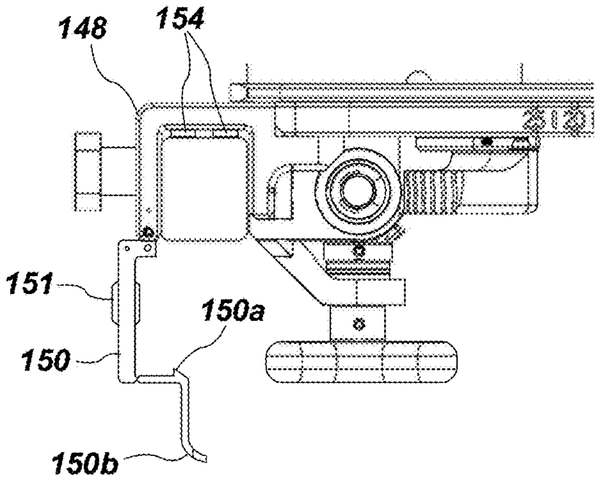
FIG. 26*b* is a close-up detailed view of the channel and locking mechanism of FIG. 26*a* with the locking mechanism in an open position.
Figure 27:
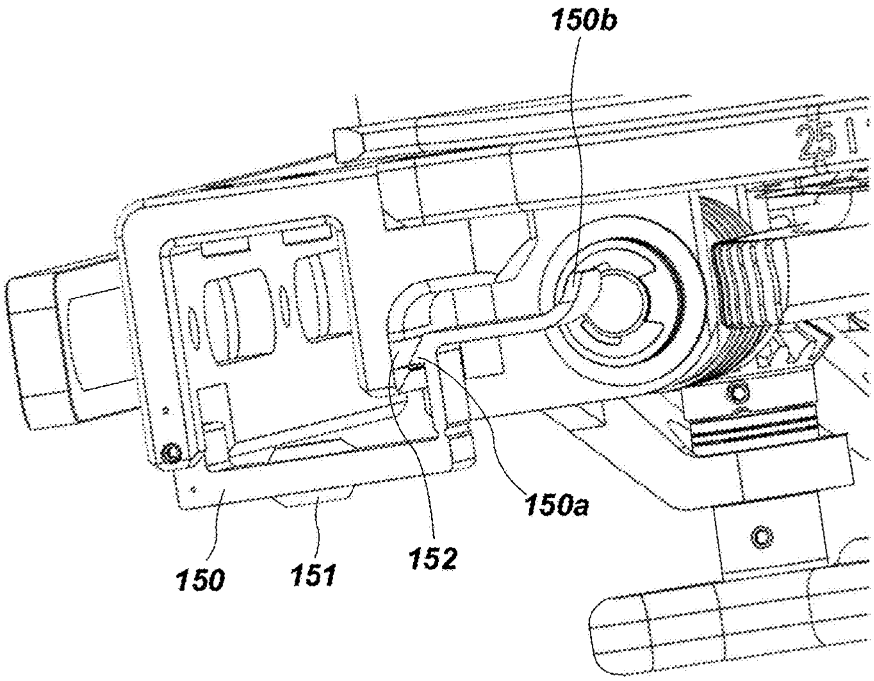
FIG. 27 is a perspective view of the channel and locking mechanism of FIG. 26*a*.

In some configurations, the c-channels 148 may be slidably connected to or mounted onto each of the rails 115, 120, so that the bolster assemblies 125, 130 may be longitudinally adjustable on the surgical frame. One or more fasteners or locking mechanisms may be provided on one or both of the opposing lateral sides to lock the c-channel(s) 148 to the rail. For example, a locking mechanism may be provided which consists of a latch 150 that has a closed position (FIG. 26*a*) wherein the latch 150 extends across the open side of the c-channel 148 and connects to the inner side of the c-channel 148, and an open position (FIG. 26*b*) wherein the latch 150 does not extend across the open side of the c-channel 148. Compared to a configuration in which the latch 150 extends from the inner side of the c-channel 148 to connect to the outer side of the c-channel 148, extending inwardly may reduce the ability of the latch 150 to undesirably catch on surgical sheets, cords, other equipment, or the clothing of any personnel. The latch 150 may have an outwardly extending lip 150*a* which mates with a groove 152 (FIG. 27) provided on the exterior side of the inner portion of the c-channel 148. The latch 150 may include a release 150*b* on the inner side, to allow a clinician to reach under the base 135 and pull on the release 150*b* to release the latch 150 manually. Downward pressure on the release 150*b* may release the lip 150*a* of the latch 150 from the groove 152 of the c-channel 148. In some configurations, the pivotable connection between the latch 150 and the c-channel 148 may be spring biased, such that the latch 150 is biased to open when a clinician exerts downward force on the release 150*b*.

The latch 150 may also include one or more gussets 151. The gusset(s) 151 may be formed of a material that is resilient, such as rubber or any other suitable material. When the latch 150 is closed, it may compress the gusset 151 against the rail 115, 120. This compression force may improve the closure of the latch 150 against the rail 115, 120 and reduce slippage of the c-channel 148 relative to the rails 115, 120 of the surgical frame when the latch 150 is closed. The c-channel 148 may additionally include one or more rail glides 154 positioned on an inner side of the c-channel 148. The rail glides 154 may improve the ability to slide the base 135 along the rails when the latch 150 is in the open position. In use, a clinician may first slide the base 135 of each of the bolster assemblies 125, 130 into the desired longitudinal position along the rails 115, 120 of the surgical frame. If rail glides 154 are provided within the c-channels 148, sliding the bases 135 may be easier compared to configurations without rail glides 154. When the bases 135 are each in the desired position, the clinician may then pivot the latch 150 from the open position to the closed position, locking it into place with the lip 150*a* in the groove 152 of the c-channel 148, and compressing the gusset(s) 151 against the rails 115, 120. The bolster assemblies 125, 130 may each be adjusted longitudinally with or without a patient being supported by the bolster assemblies.

In some configurations, the lateral sides of the lower portion 140 of the base 135 of one or more of the bolster assemblies 125 and 130 may also be provided with adapters 153 that can be used for table-mounted surgical accessories (such as retractor articulating arms, etc.). In the specific embodiment shown in FIGS. 22-27, adapters 153 are attached to the lateral sides of each of the c-channels 148. Adapters 153 may provide a convenient method for a clinician to attach table-mounted surgical accessories. In other configurations, adapters 153 may be provided only on one lateral side of the base 135 of one or more of the bolster assemblies 125 and 130; and in other configurations adapters 153 need not be provided. As another alternative, adapters 153 may be provided in a plurality of different locations and configurations of one or more of the bolster assemblies 125, 130. In yet other configurations, one or more Clark sockets may be provided attached to one or more of the lateral sides of the lower portion 140 of the base 135 of one or more of the bolster assemblies 125, 130. Clark sockets may be attached either directly to the lateral sides, or may be attached to the adapters 153.

Referring to FIG. 28-31, one or more of the bolster assemblies 125, 130 may be provided with an upper portion 145 of the base 135 that may be rotatably connected to the lower portion 140, such that the upper portion 145 may rotate relative to the lower portion 140 in a coronal plane. In the specific configuration shown in FIG. 28, the pelvic bolster assembly 125 has an upper portion 145 of the base 135 that is rotatable relative to the lower portion 140. The thoracic bolster assembly 130 may be similarly provided with an upper portion 145 that is rotatable relative to the lower portion 140. The upper portion 145 may be rotatably connected to the lower portion 140 via one or more gears. For example, the upper portion 145 may be connected to the lower portion 140 via a worm drive, with a handle that operates the worm drive connected via one or more gears to enable the plane in which the handle is rotated to be parallel to the plane in which the upper portion 145 is rotated, as described in more detail below. Rotating the handle in a plane parallel to the rotational plane of the upper portion 145 may make the process more intuitive for a user.

As seen in FIG. 28, the lower portion 140 may include a plate 141 extending between a first bracket 131 and a second bracket 133. The plate 141 may be secured by any means known in the art such as screws, bolts, or the like allowing the plate 141 and brackets 131, 133 to sit flush along a top plane of the lower portion 140. The brackets 131, 133 may include the c-channels 148 or other channels for receiving rails of a surgical frame. In this specific configuration, the plate 141 of the lower portion 140 may include one or more recessed tracks 142, with the upper portion 145 having one or more roller bearings 146 which travel in the recessed tracks 142. In other configurations, the upper portion 145 may have the recessed track 142 and the lower portion 140 may include the roller bearings 146. The addition of the recessed track 142 and roller bearings 146 may improve the supported rotation of the upper portion 145 relative to the lower portion 140, as well as make it easier to rotate the upper portion 145.

Figure 29:
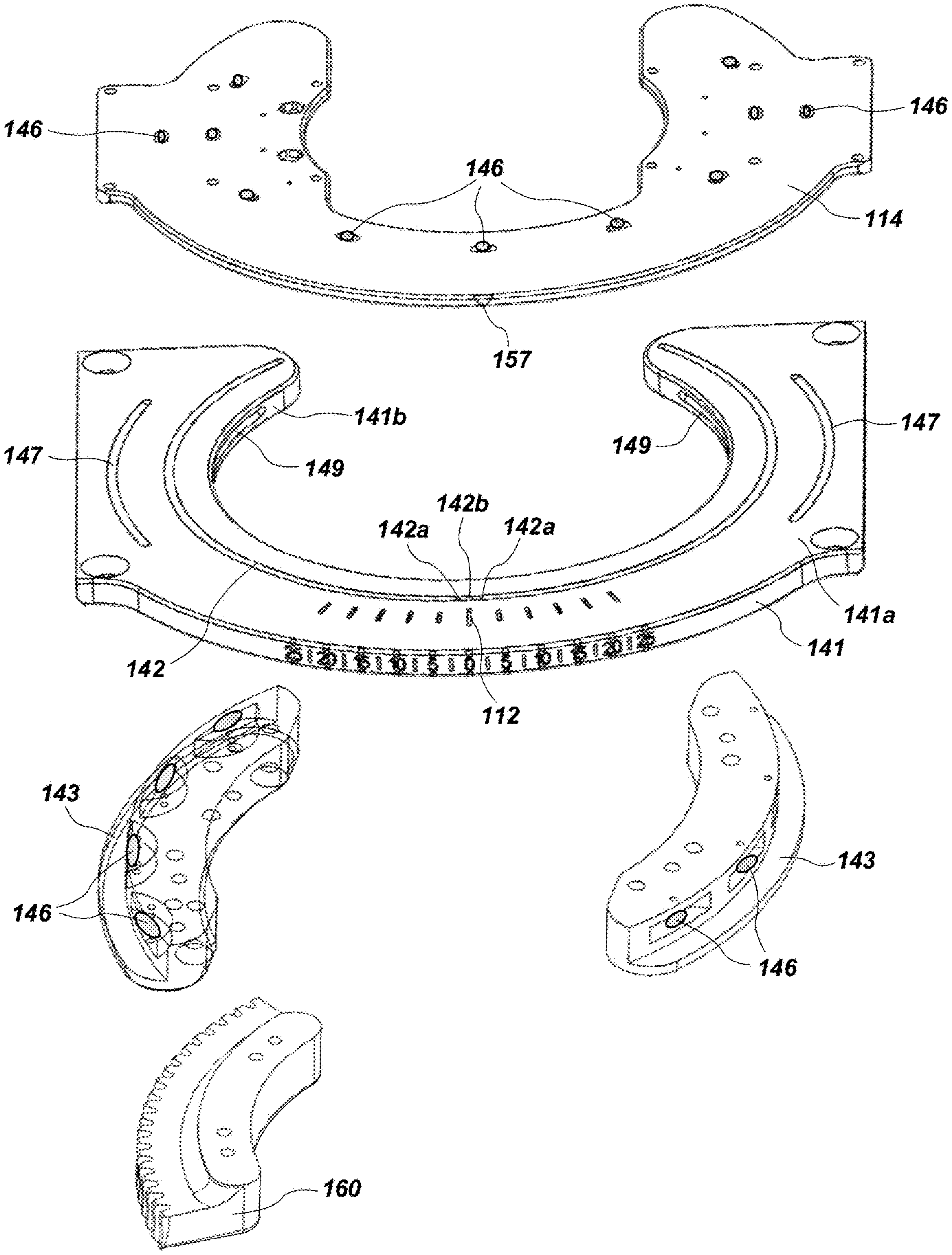
FIG. 29 is another partially exploded view of a pelvic support.

In the configuration shown in FIGS. 28-29, a first recessed track 142 is provided on a top side 141*a* of the plate 141, the first recessed track 142 extending substantially along the entire inner circumference of the U-shaped plate 141, from one side of the inner circumference of the U-shaped plate 141 to the other side. In other configurations, the first recessed track 142 may be smaller or not extend as far along the inner circumference. A plurality of roller bearings 146 are shown placed in the first recessed track 142. It will be appreciated that these roller bearings 146 are typically attached to the upper portion 145, as seen in FIG. 29, but are shown in the partially exploded view of FIG. 28 in the first recessed track 142 to show the relationship between the recessed track 142 and the roller bearings 146.

The configuration shown in FIGS. 28-29 also has a second set of recessed tracks 147 provided closer to the outer perimeter of the top side 141*a* of the plate 141, with one set on each outer side of the U-shaped plate 141. These outer tracks 147 also have one or more roller bearings 146 positioned therein. The addition of outer tracks 147 may provide further support to the outer sides of the upper portion 145. The outer tracks 147 may be positioned roughly beneath the pelvic support pads 180*a*, 180*b*, where the majority of the weight of the patient's pelvis may be supported. In other configurations, outer tracks 147 may or may not be provided. In yet other configurations, the outer tracks 147 may extend longer to cover the entire outer circumference of the U-shaped plate.

A third set of recessed tracks 149 may also be provided on an inner circumference 141*b* of the plate 141, perpendicular to the top side 141*a* of the plate 141 and top surface track(s) 142, 147. This third set of recessed tracks 149 are configured to receive roller bearings 146 of the inner diameter support 143 of the upper portion 145. The inner diameter support 143 may have a crescent shape similar to the circumference of the U-shaped upper portion 145, or any other suitable shape. The inner diameter support 143 may extend below the lower portion 140, and may act as a bridge to connect the worm gear 160 to the upper portion 145 as described in more detail below. The roller bearings 146 of the inner diameter support 143 may rotate in a plane perpendicular to the roller bearings 146 positioned on the top side 141*a* of the plate 141. The third set of recessed tracks 149 may engage with roller bearings 146 positioned in the inner diameter support 143 of the upper portion 145, and help the inner diameter support 143 rotate easily with respect to the inner circumference 141*b* of the lower portion 140. In other configurations, an inner diameter support 143 need not be provided.

Figure 30:
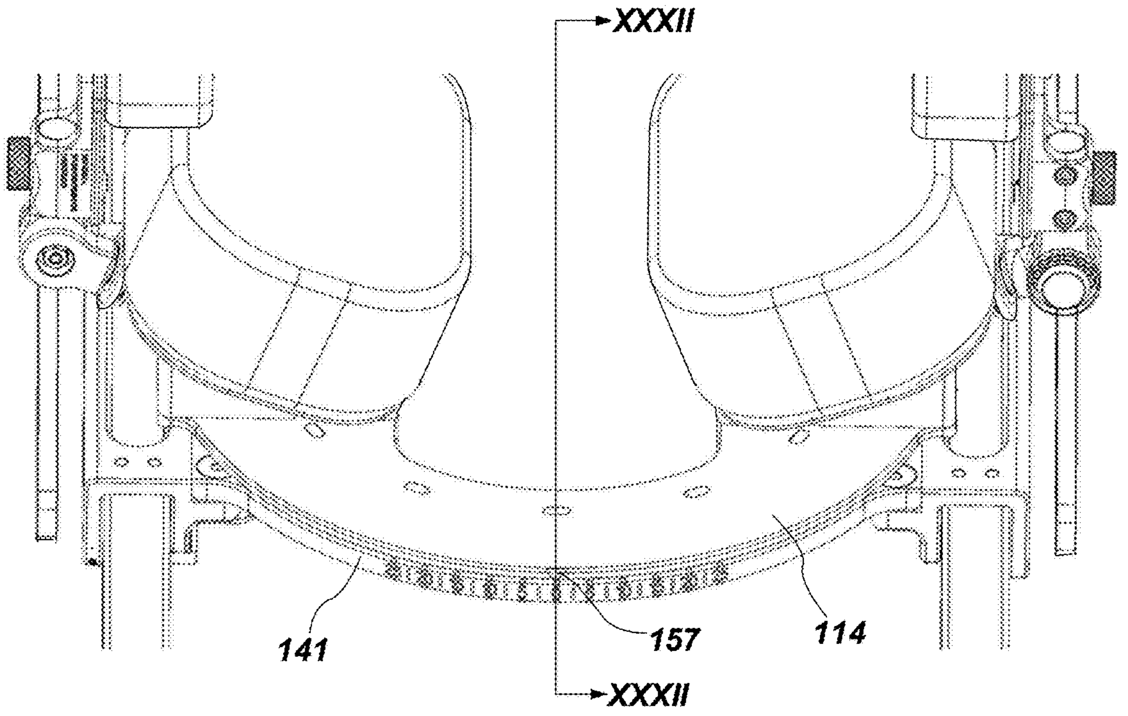
FIG. 30 is a top perspective view of a pelvic support.
Figure 31:
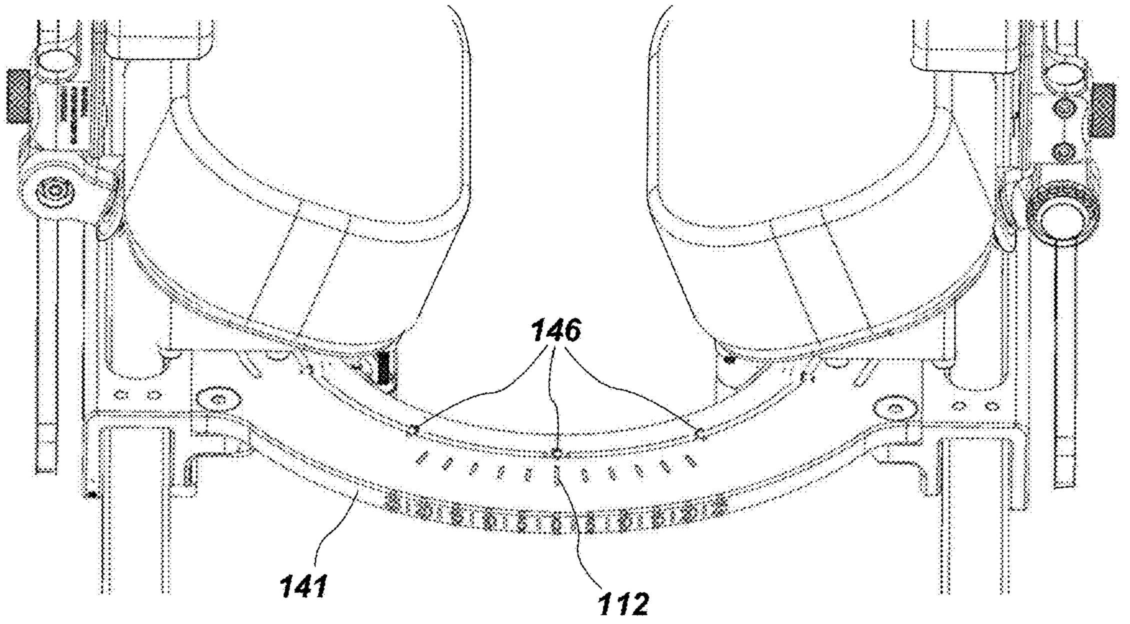
FIG. 31 is a top perspective view of the pelvic support of FIG. 30 with the plate of the top portion removed.

The plate 141 of the lower portion 145 may be formed entirely from radiolucent materials, or may be formed substantially from radiolucent materials. Radiopaque materials may be added to provide x-ray visible markings as desired. For example, it may be desirable for the surgeon to view the various degrees of rotation radiographically. One or more radiopaque markers 112 may be provided in the lower portion 140. In the configuration shown, radiopaquemarkers 112 are provided at 0 degrees, 5 degrees, 10 degrees, 15 degrees, 20 degrees, and 25 degrees. In other configurations, fewer or more radiopaquemarkers 112 may be provided at similar or different angular increments. FIG. 30 shows a perspective view of the pelvic bolster assembly 125, and FIG. 31 shows the same view with the top portion base plate 114 removed.

Figure 32:
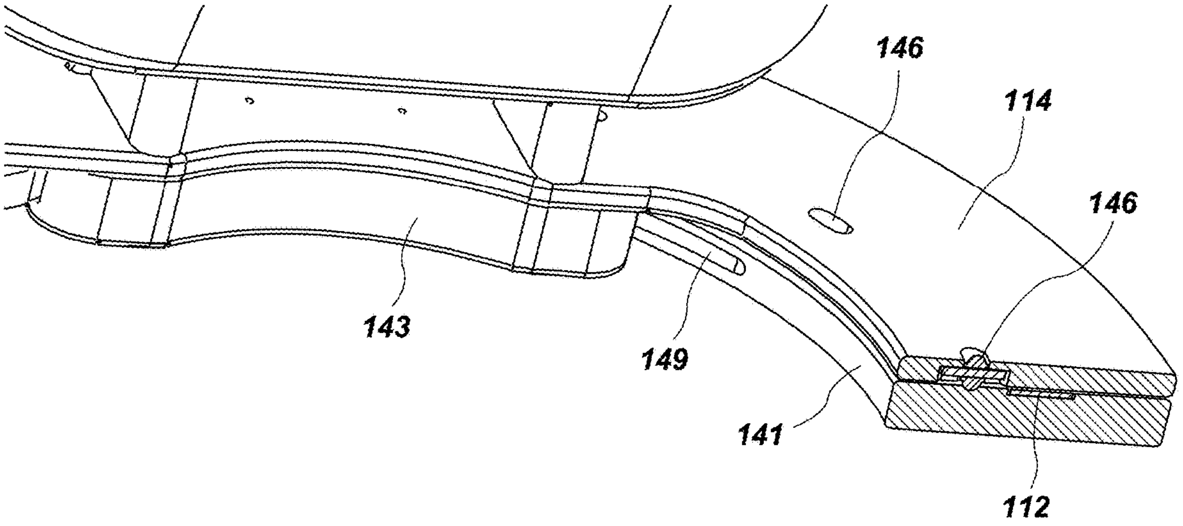
FIG. 32 is a perspective cross-sectional view taken along line XXXII of FIG. 30.

FIG. 32 shows a cross-sectional view of FIG. 30 taken along line XXXII of FIG. 30. In this cross-sectional view, the roller bearing 146 mounted in the upper portion 145 base plate 114 can be seen, as well as the radio opaque marker 112 positioned at 0 degrees in the lower portion 140. While the roller bearings 146 may be mounted in the top portion 145 base plate 141 with openings 116 for the roller bearings 146 to extend through, in other configurations the roller bearings 146 are located entirely within the base plate 114 of the upper portion 145.

The front side of the plate 141 of the lower portion 140 may additionally be provided with numbered markings 156 to visually indicate the degree of rotation of the upper portion 145 relative to the lower portion 140. A marker 157 on the plate 114 of upper portion 145 may also be provided to directly indicate the degree of rotation. Any numbered markings 156 desired may be provided, such as 0, 5, 10, 15, 20, and 25 to indicate the degree of rotation. In other configurations, numbers need not be provided.

Figure 33:
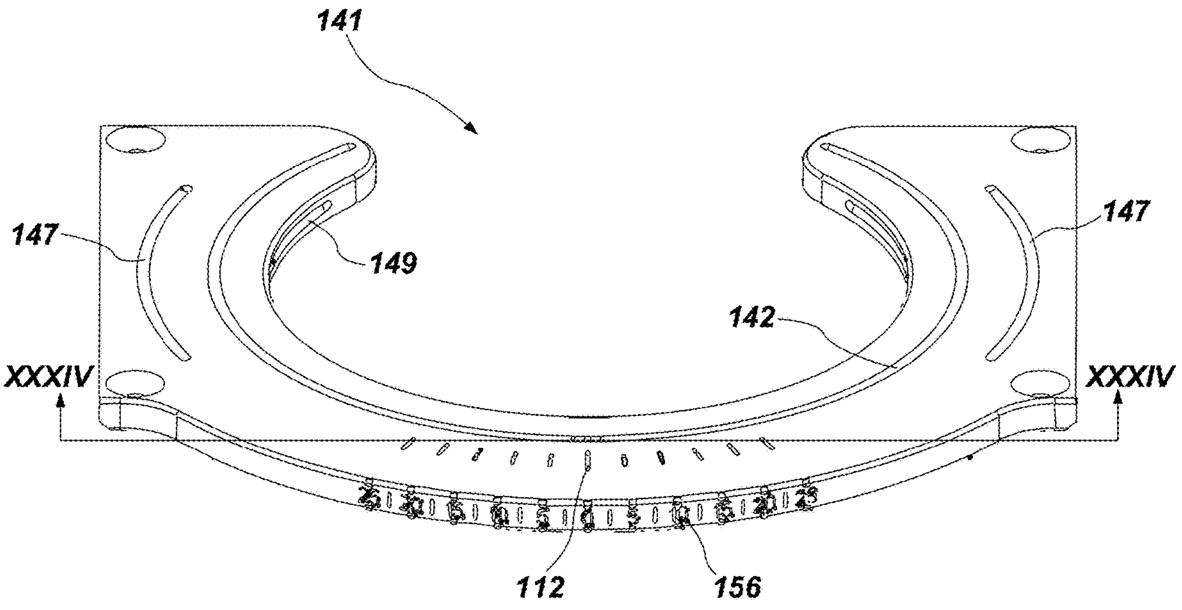
FIG. 33 is a perspective view of a plate of a bottom portion of a support assembly.
Figure 34:
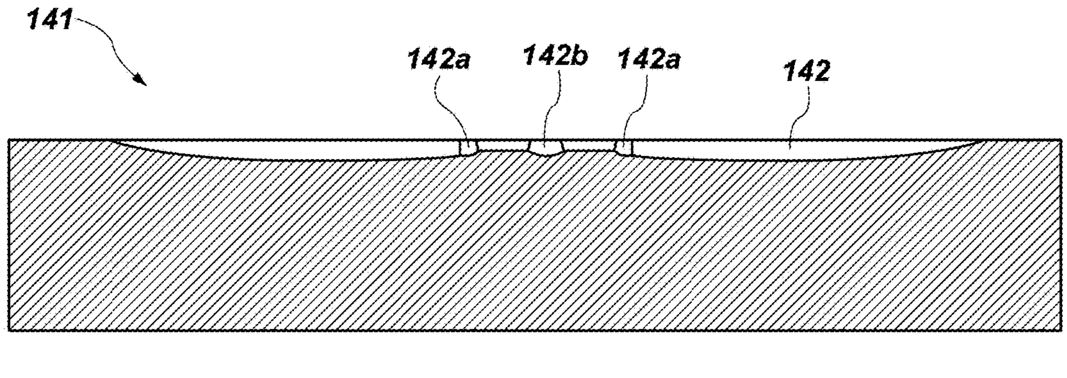
FIG. 34 is a cross-sectional view of the plate of FIG. 33 taken along line XXXIV of FIG. 33.

In yet other configurations, it may be desirable to provide tactile feedback to the movement of the upper portion 145 relative to the lower portion 140. This may be provided in any suitable manner. In one specific example, a notch or bump in the track 142 may be provided at 0 degrees of rotation. As seen in the cross-sectional view of FIG. 34, taken along line XXXIV of FIG. 33, the track 142 may be provided with a small ramped up portion 142*a* on both sides of the 0 degree position. At the 0 degree position, the track 142 may have a small depression 142*b* sized to fit a roller bearing 146. In use, a clinician desiring to rotate the patient's pelvis or chest in the coronal plane away from the 0 degree position would first have to put enough rotational pressure to overcome the small depression 142*b*. Once overcome, the roller bearing 146 would continue down the ramped portion 142*a* and enter the track 142. As the clinician continues to rotate, additional depressions 142*b* may be provided for tactile feedback as desired. In the configuration shown, the 0 degree position is the only position provided with tactile feedback, but other positions may be provided with tactile feedback as desired.

Figure 35:
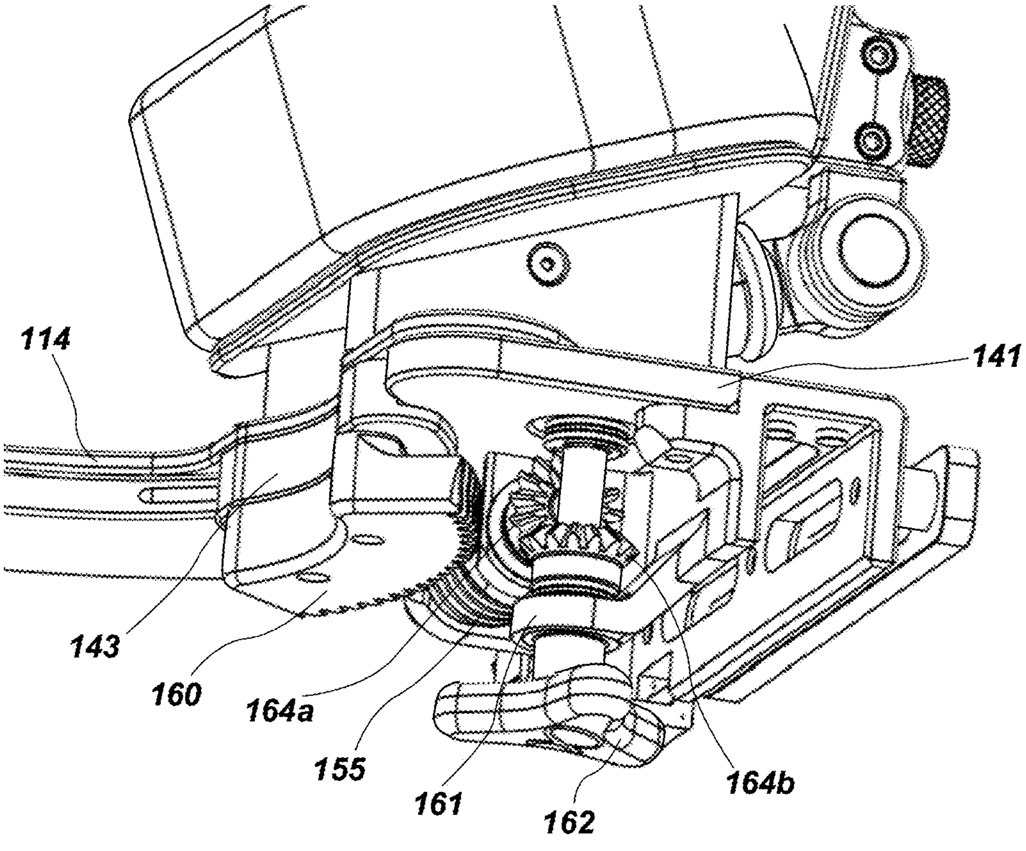
FIG. 35 is a front, bottom perspective view of the rotatable connection between the top portion and the bottom portion of a pelvic bolster assembly.
Figure 36:
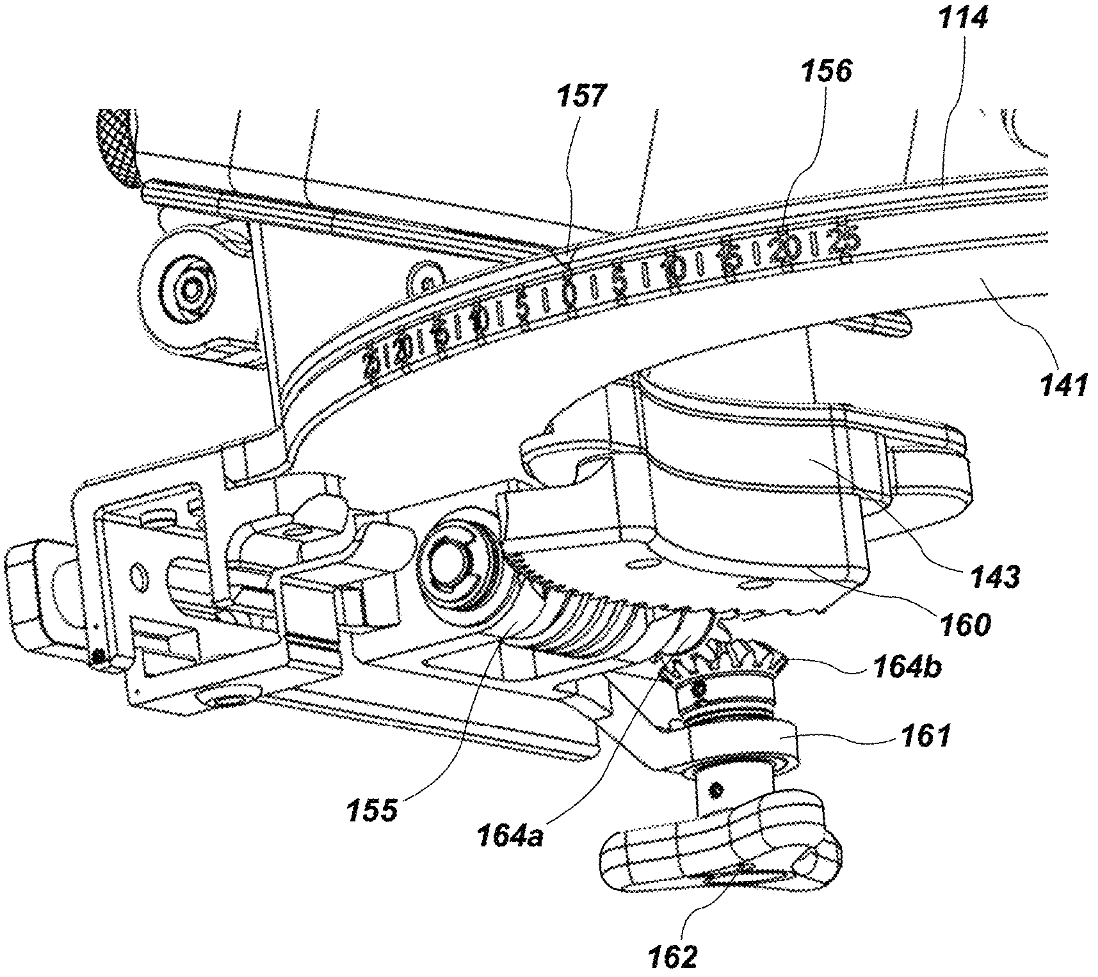
FIG. 36 is a rear, bottom perspective view of the rotatable connection between the top portion and the bottom portion of a pelvic bolster assembly of FIG. 35.

Turning now to FIGS. 35-36, one specific method of rotation of the upper portion 145 relative to the lower portion 140 is shown. In this non-limiting example, a worm drive connects the upper portion 145 and the lower portion 140. The worm drive may comprise a worm shaft 155 attached on one lateral side to the lower portion 140 of the base 135, and a worm gear 160 attached to the upper portion 145 of the base 135, the worm gear 160 coupled to the worm shaft 155. The worm gear 160 may be connected to the upper portion 145 of the shaft 155 through the inner diameter support 143, which may be directly coupled to the plate 114 of the upper portion 145. The inner diameter support 143 may have a depth similar to or slightly larger than the plate 141 of the lower portion 140 of the base 135, such that it extends from below the lower portion 140 to the upper portion 145. The inner diameter support 143 may also rotate relative to the lower portion 140 as described above, and in some configurations includes roller bearings receivable in a recessed track of the plate 141 of the lower portion 140 as described above. The worm shaft 155 may be connected to the handle 162 via one or more gears 164*a*, 164*b* to change the plane in which the handle 162 is rotated. The channel 148 connected to base plate 141 may also be provided with a handle support 161. The handle 162 may pass through the handle support 161 to provide additional lateral support for handle 162.

A handle 162 may be provided on one side of the bolster assemblies 125, 130, and the rotation of the handle 162 in a counterclockwise direction may rotate the upper portion 145 in a counterclockwise direction. Similarly, the rotation of the handle 162 in a clockwise direction may rotate the upper portion 145 in a clockwise direction. This intuitive movement of the handle 162 in direct relation to the movement of the upper portion 145 may make the use of the patient support assembly 110 easier for a clinician.

In some configurations, it may be desirable to provide the handle 162, gear(s) 163, worm shaft 155, and/or worm gear 160 on one lateral side to improve radiographic imaging. In other configurations, it may be desirable to provide the handle 162 and worm drive on both lateral sides of the bolster assemblies 125, 130. It will be appreciated that in other configurations, different drive mechanisms and/or linkages between the upper portion 145 and lower portion 140 may be used, such as rack and pinion, a hypoid, a spiral bevel gear, etc. In some embodiments, the mechanism is manually operated; and in other embodiments, the mechanism is driven by an electric motor, which can be controlled with the push of a button or other actuator proximal to the patient and/or bolster assemblies or from a remote device.

The upper portion 145 of the base 135 may also have one or more lateral bolsters 170 attached thereto. The lateral bolsters 170 may be substantially perpendicular to the bolster assemblies 125, 130 to provide lateral support to a patient positioned on the bolster assemblies 125, 130. In the non-limiting embodiment shown in FIGS. 37-38, two lateral bolsters 170 are provided on each base 135 of the bolster assemblies 125, 130. Alternatively, one lateral bolster 170 may be provided, or lateral bolsters 170 may be provided only on the pelvic bolster assembly 125 or the thoracic bolster assembly 130. In other configurations, lateral bolsters 170 may not be provided, or may be provided on only one side of the bolster assemblies 125, 130. The lateral bolsters 170 may be provided on opposing lateral sides of the upper portion 145. In some configurations, the lateral bolsters 170 may be provided with one or more hinges 176 such that the lateral bolsters 170 may be adjusted as described in more detail below. Lateral bolsters 170 may also have one or more lateral pads 172 attached thereto. The lateral pads 172 may be comprised of a deformable material. The lateral pads 172 may also be provided with removable, padded covers as described below. The lateral bolsters 170 may be provided with a strap 174 on one side, and an opposing lateral bolster 170 may be provided with a buckle 173 or other mechanism for receiving the strap 174.

Figure 37:
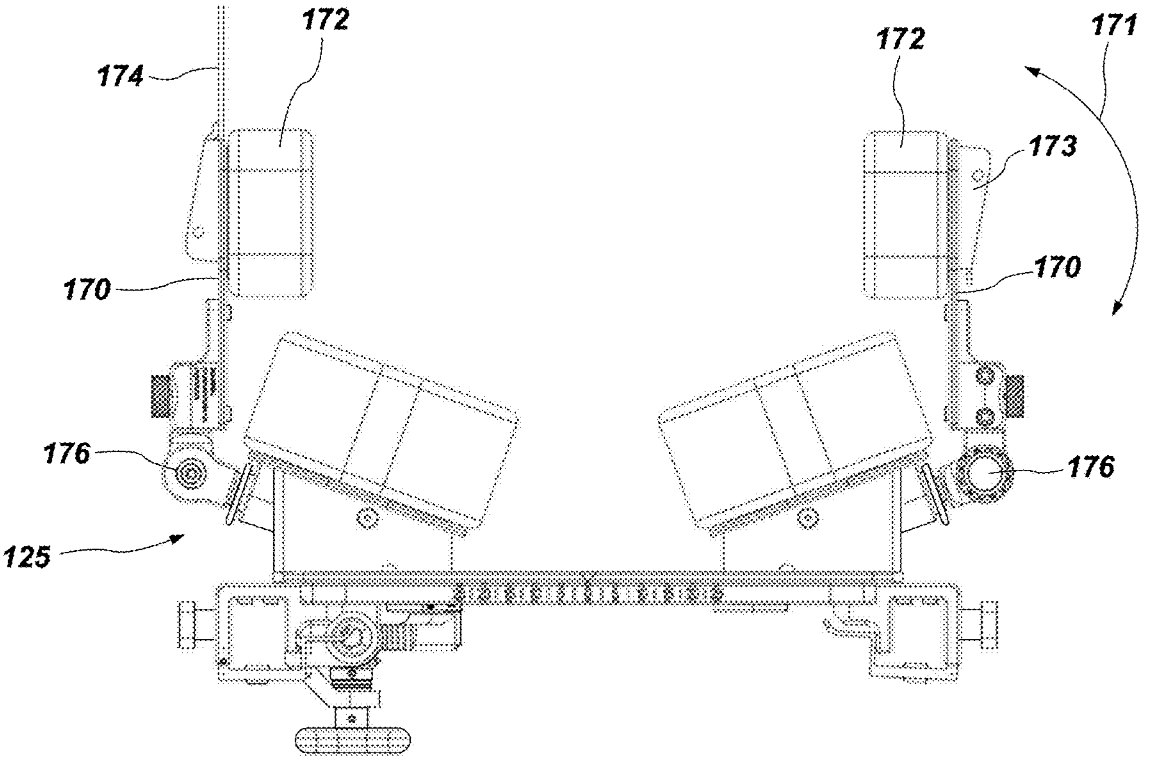
FIG. 37 is a rear plan view of a pelvic bolster assembly.
Figure 38:
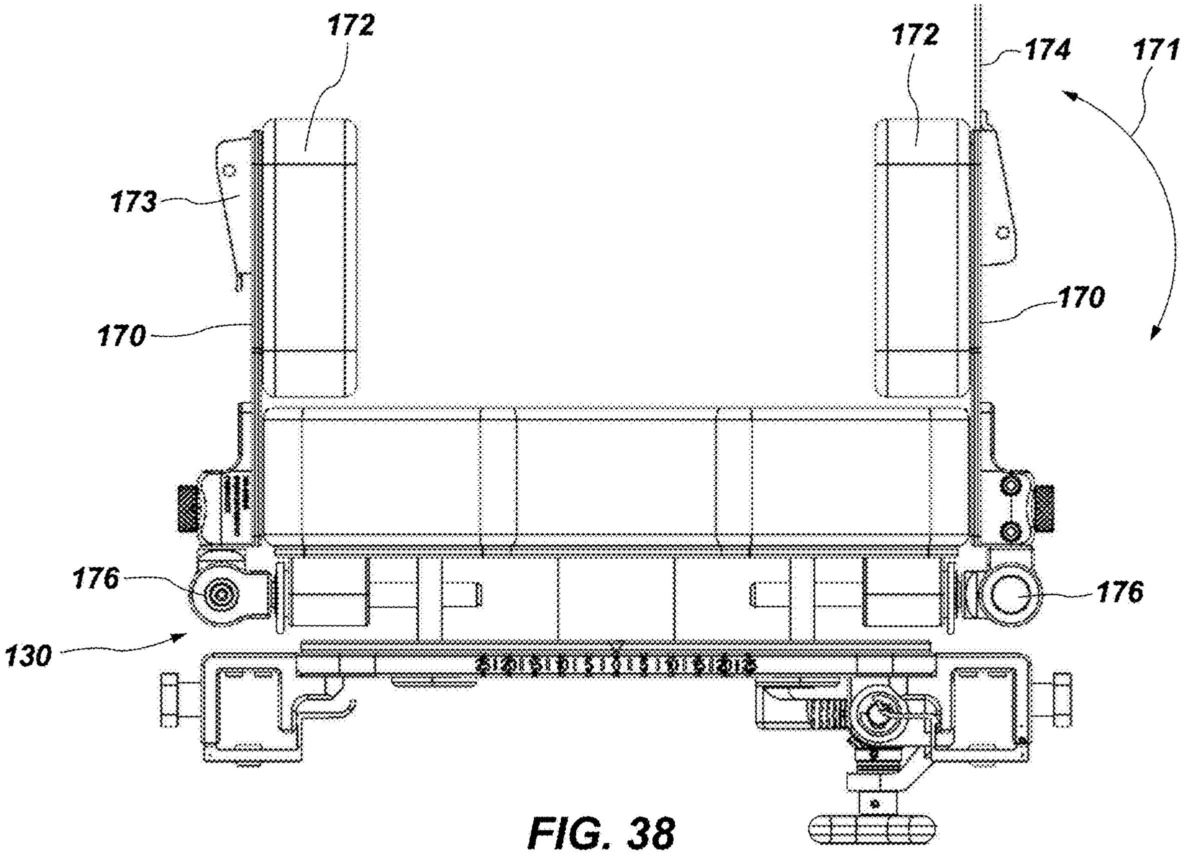
FIG. 38 is a front plan view of a thoracic bolster assembly.

FIG. 37 shows a detailed view of a pelvic bolster assembly 125 according to one non-limiting example, and FIG. 38 shows a thoracic bolster assembly 130 according to one non-limiting example. The lateral bolsters 170 may be substantially perpendicular to the bolster assemblies 125, 130 to provide lateral support to a patient positioned on the bolster assemblies 125, 130. In some configurations, the lateral bolsters 170 on one or more of the bolster assemblies 125, 130 may be provided with one or more hinges 176 such that the lateral bolsters 170 may be adjusted, both inwardly and outwardly as well as forward and backward in a sagittal plane. For example, the lateral bolsters 170 may be provided with one or more indexed locking hinge mechanisms and may be adjustable inwardly and outwardly in a transverse plane as desired (arrows 171 in FIGS. 37-38 show the adjustment of the lateral bolsters 170 of the pelvic bolster assembly 125 and thoracic bolster assembly 130, respectively). These hinges 176 may be used to vary the amount of lateral compression by the lateral bolsters 170 on the patient as a function of the hinge angle.

Figure 39:
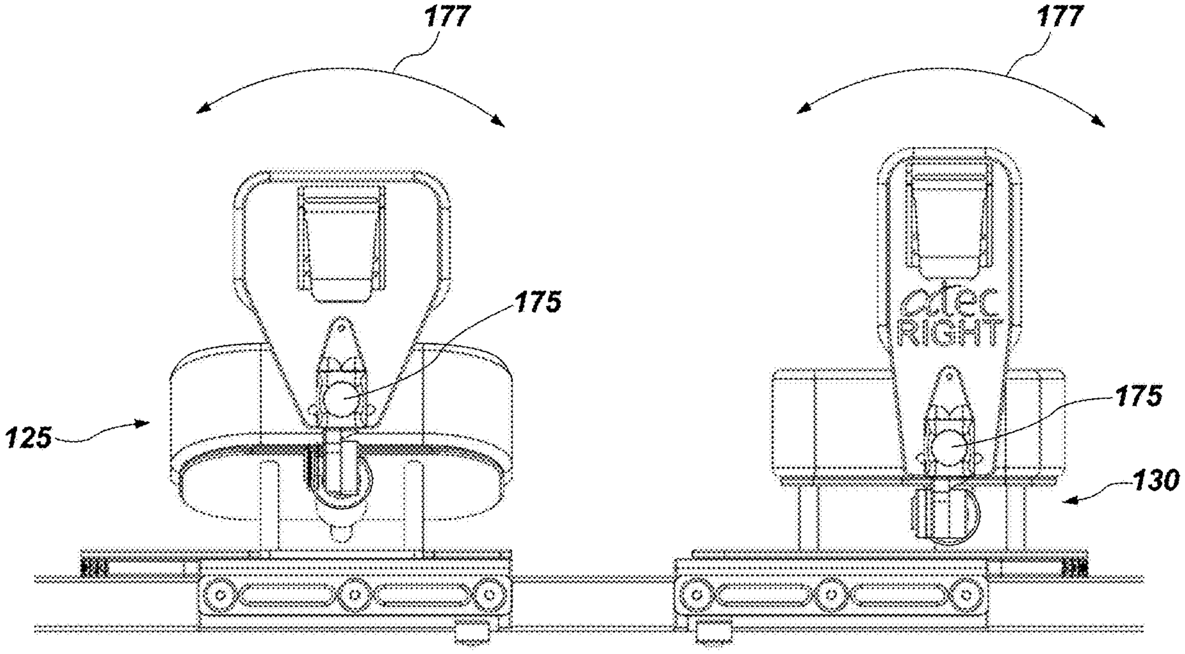
FIG. 39 is a side plan view of the pelvic and thoracic bolster assemblies of FIGS. 37-38 mounted on rails of a surgical frame.

According to another aspect, one or more of the lateral bolster(s) 170 on one or more of the bolster assemblies 125, 130, may be adjustable in a sagittal plane. For example, each of the lateral bolsters 170 of the pelvic bolster assembly 125 and thoracic bolster assembly 130 may be provided with adjustment mechanisms such that they may be adjusted both in a sagittal and a transverse plane via one or more locking adjustable hinges 175. The sagittal plane adjustment may be accomplished by any suitable adjustment means, and may have similar positions as the configuration shown in FIGS. 15-17 above. Arrows 177 in FIG. 39 indicate the direction of adjustment of the lateral bolsters 170 in a sagittal plane.

Figure 40:
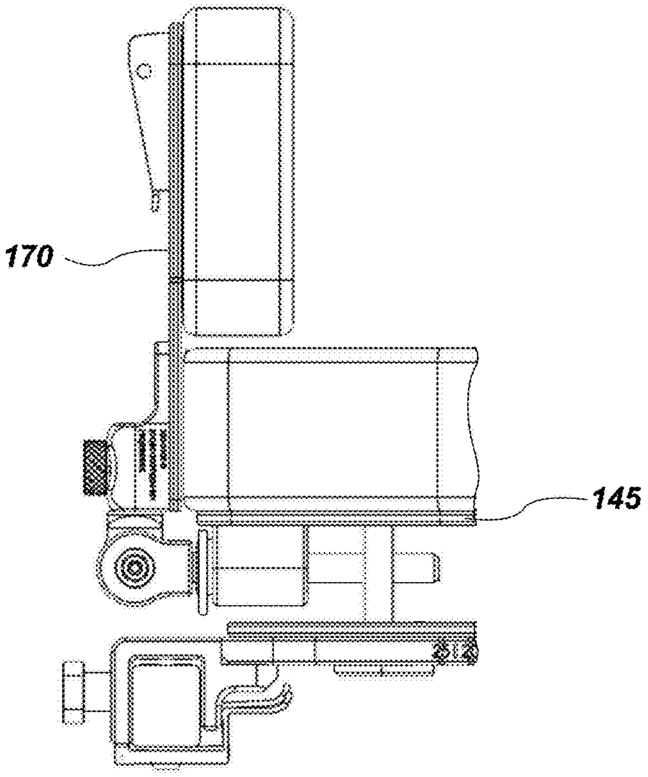
FIG. 40 is a front plan view of a portion of a thoracic bolster assembly with the lateral bolster attached.
Figure 41:
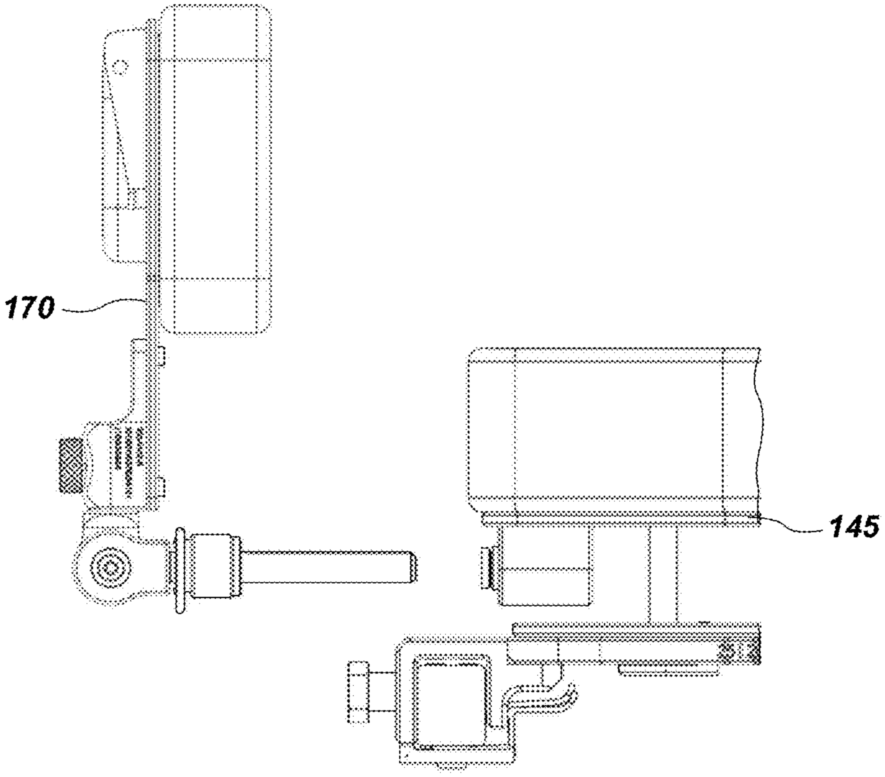
FIG. 41 is a front plan view of the portion of the thoracic bolster assembly of FIG. 40 with the lateral bolster detached.

In some configurations the lateral bolsters 170 may be completely removable from the upper portion 145. FIG. 40 shows a partial front view of a thoracic bolster assembly 130 with the lateral bolster 170 locked in place on the upper portion 145, and FIG. 41 shows the lateral bolster 170 removed from the upper portion 145. Removable lateral bolsters 170 may make it easier to place the patient on the bolster assemblies. For example, one or more lateral bolsters 170 may be entirely removed, the patient placed on the bolster assemblies 125, 130, and then the lateral bolsters 170 locked back into place on the upper portion 145 of the bolster assemblies 125, 130.

Figure 42:
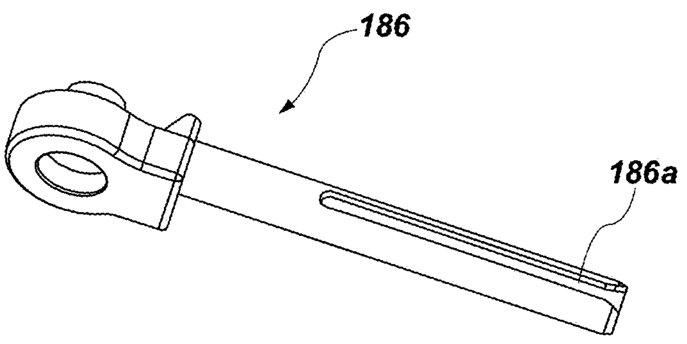
FIG. 42 is a perspective view of a locking pin used to attach the lateral bolster to a bolster assembly.
Figure 43:
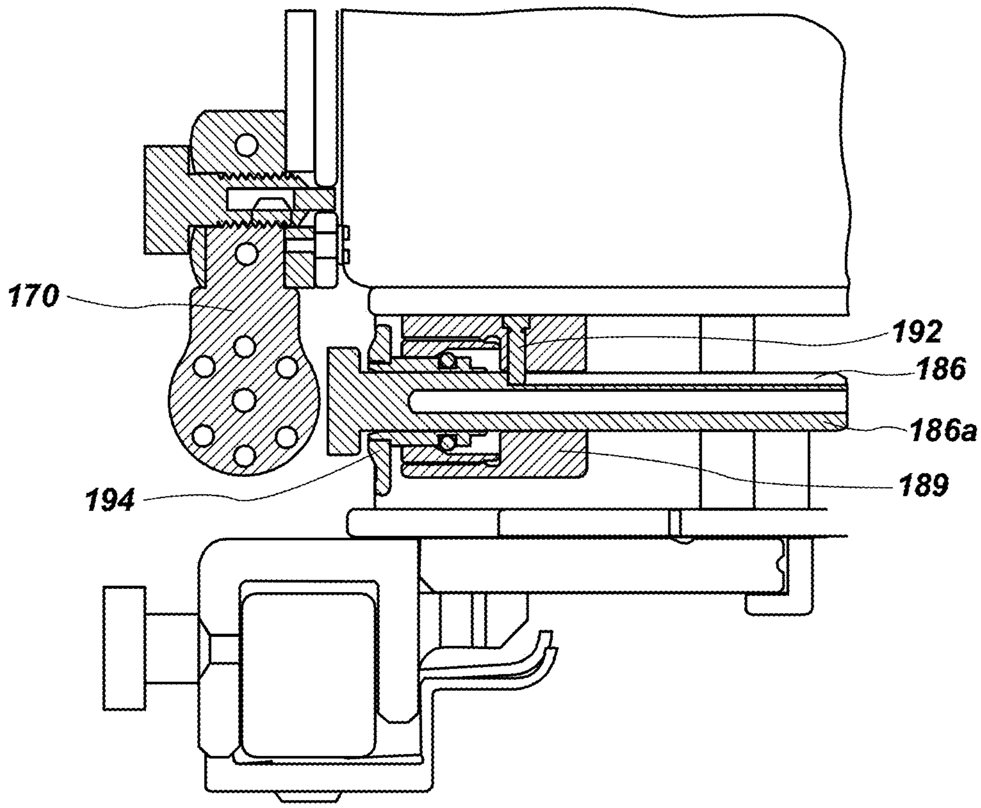
FIG. 43 is a cross sectional view of the lateral bolster positioned in the thoracic bolster assembly.

Lateral bolsters 170 may be removably connected to the upper portion 145 in any suitable manner. In one configuration, the lateral bolsters 170 may be provided with a locking pin 186 (FIG. 42) which can be inserted into a support block 189 on the upper portion 145 (FIG. 43). The locking pin 186 may include a channel 186*a*, and a key pin 192 inserted through the support block 189 may engage the locking pin 186 of the lateral bolster 170. To release the lateral pads 170, an actuator may be depressed to release the locking pin 186 and allow the lateral pad 170 to remove fully from the upper portion 145. As the locking pin 186 is placed back into the support block 189, it may automatically lock into place without the need for further action. For example, a locking collar 194 may be provided which provides an inward force on the locking pin such that the locking pin 186 cannot be removed without releasing the inward force of the locking collar 194.

In some aspects, the lateral position of lateral bolsters 170 may be adjusted before being locked in position. In some aspects, lateral bolsters 170 may be moved medially without needing to disengage any locking mechanisms while requiring the disengagement of a locking mechanism to move them laterally or to remove them altogether.

According to another aspect, each of the bolster assemblies 125, 130, may be provided with one or more support pads 180, 185 attached to the upper portion 145 of the base 135, such that the support pads 180, 185 are affixed to the rotating upper portion 145. The pelvic bolster assembly 125 may comprise a pelvic support pad 180 attached to the upper portion 145 of the base 135 of the pelvic bolster assembly 125, and the thoracic bolster assembly 130 may comprise a thoracic support pad 185 attached to the upper portion 145 of the base 135 of the thoracic bolster assembly 130. The support pads 180, 185 and/or lateral pads 172 shown in these configurations may be made of any suitable compression or cushioning material, and in some configurations they may be made of memory foam. The pads 180, 185, 172 may also be provided with removable covers. The covers may be reusable or may be disposable. The covers may include additional supporting material, such as foam, in a thickness of about 1 centimeter to about 4 centimeters. In some configurations the covers include about 2.54 centimeters of foam for additional cushioning and comfort of the patient.

Figure 23:
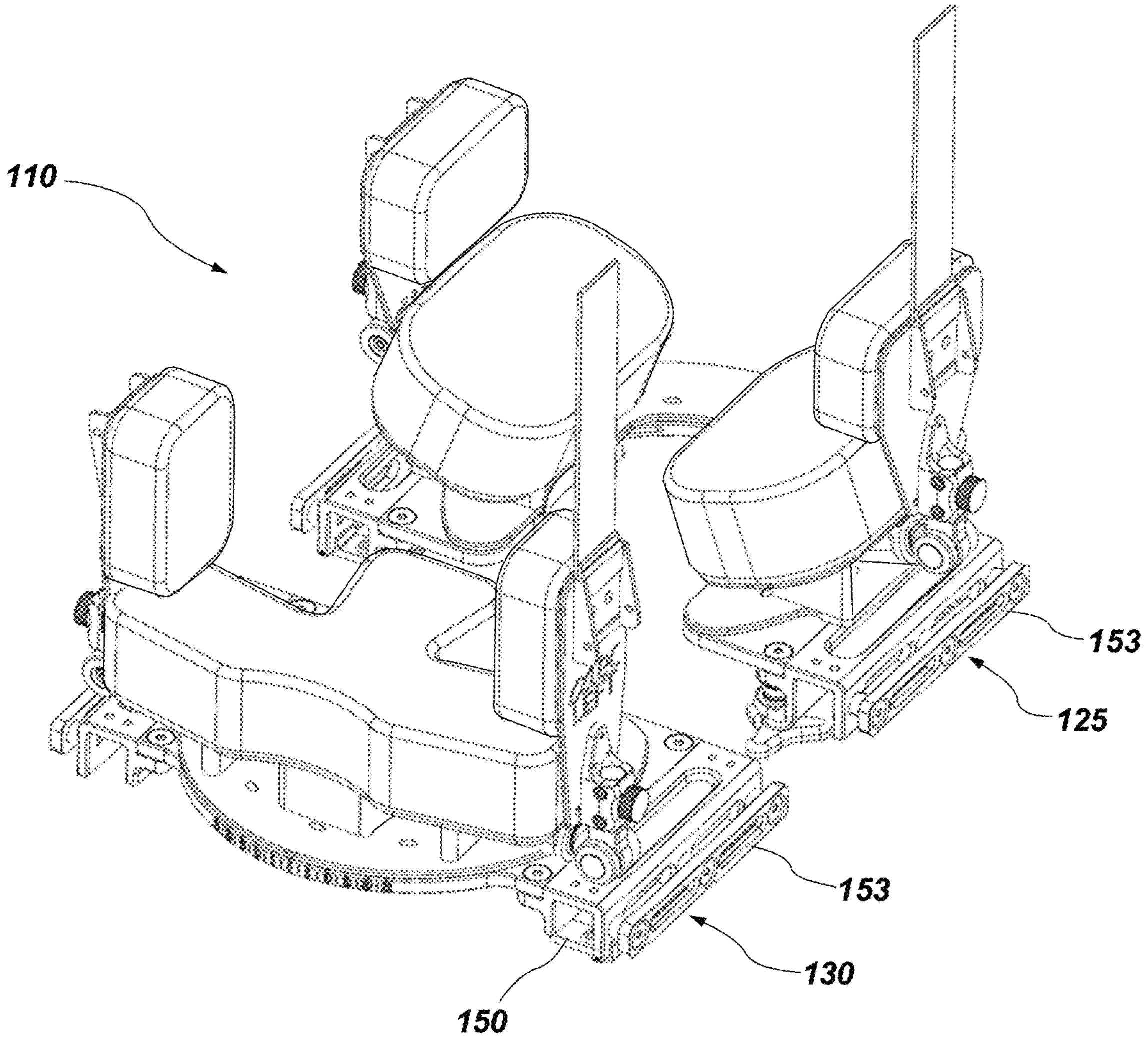
FIG. 23 is another perspective view of the patient positioning system of FIG. 22 shown without the rails of the surgical frame.
Figure 24:
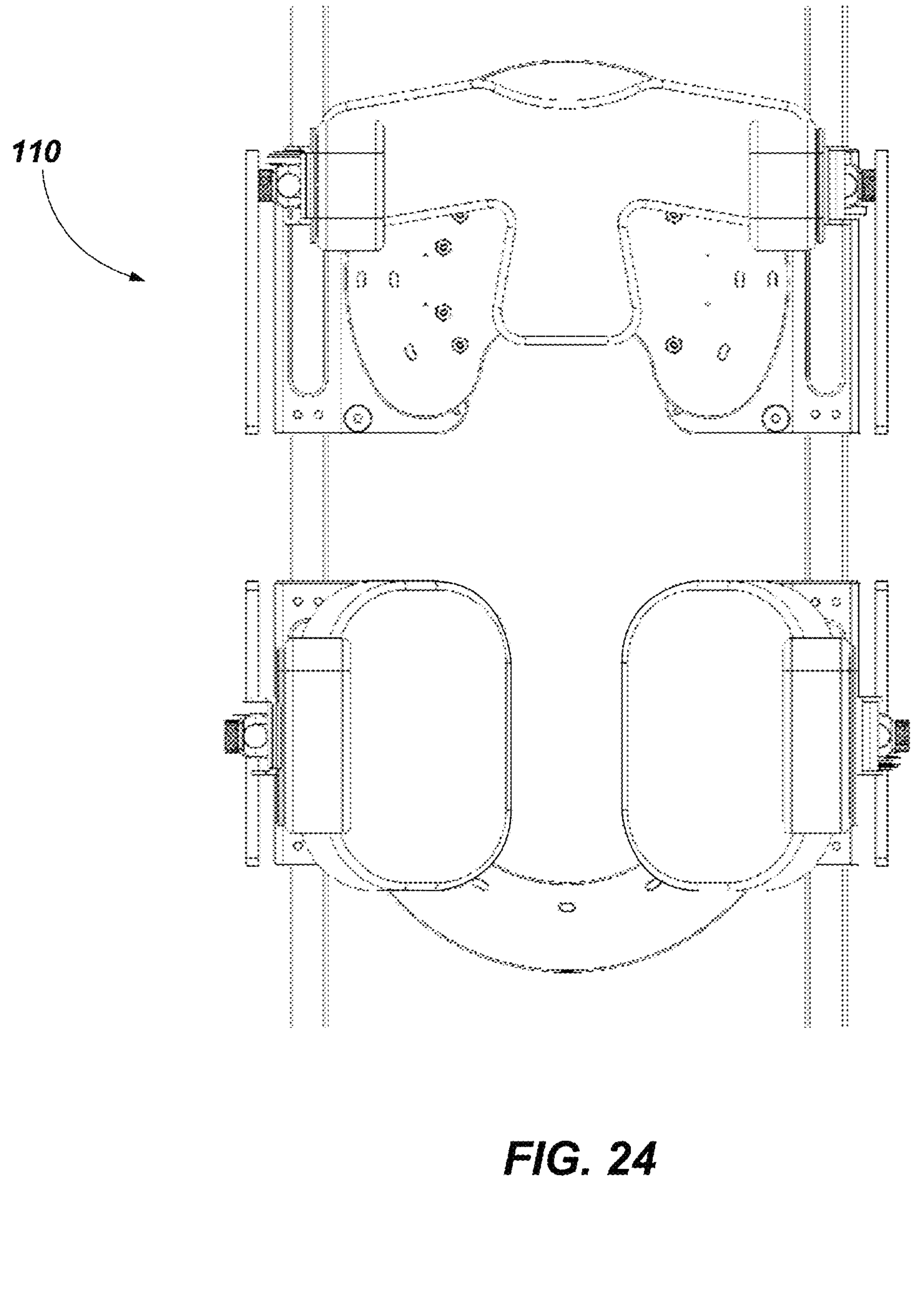
FIG. 24 is a top view of the patient positioning system of FIG. 22.
Figure 25:
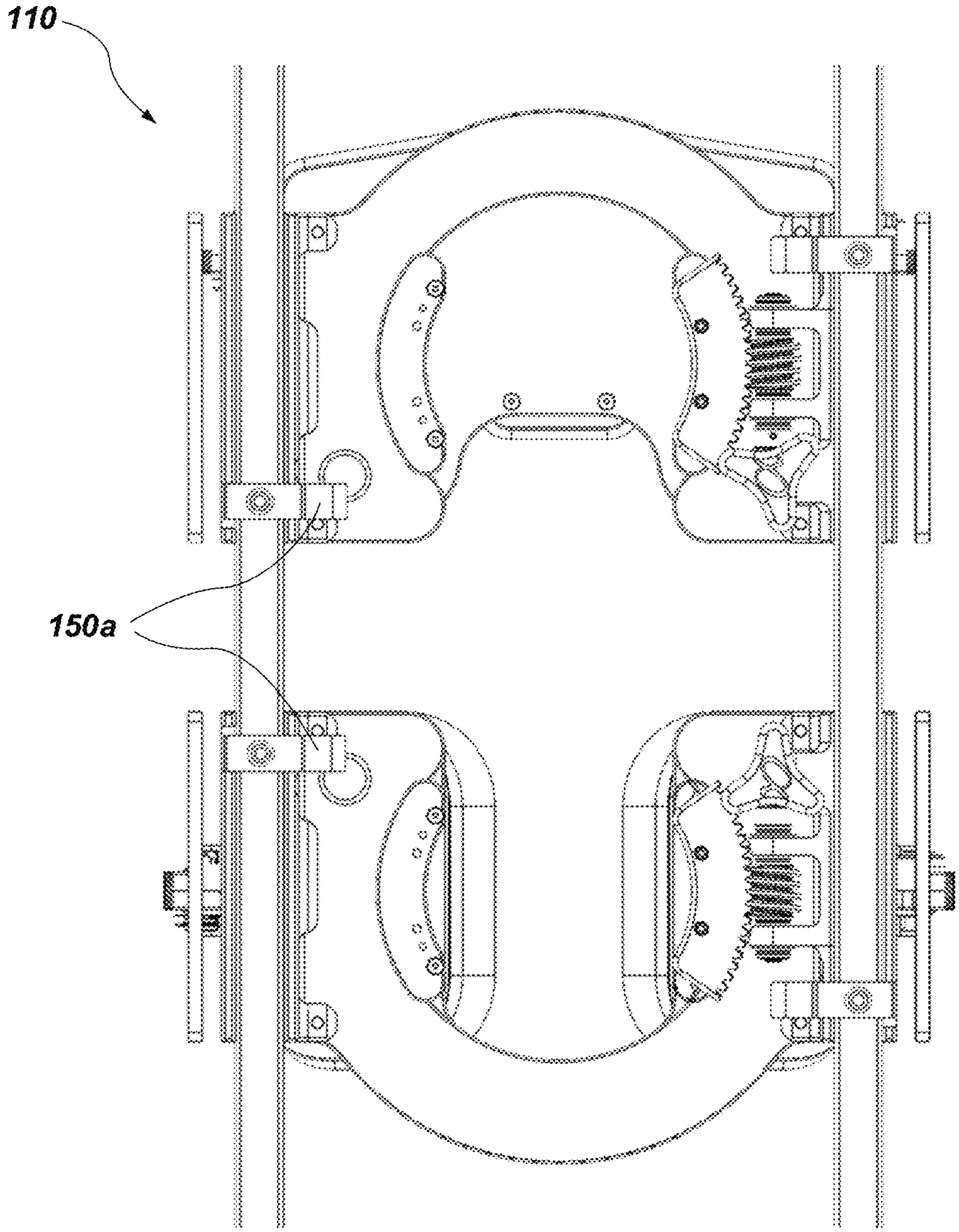
FIG. 25 is a bottom view of the patient positioning system of FIG. 22.

In the specific, non-limiting embodiment shown in FIG. 23, the pelvic bolster assembly 125 includes two pelvic support pads 180*a*, 180*b* attached to the upper portion 145 of the base 135. A sufficient space may be provided between the two pelvic support pads 180*a*, 180*b* to allow space for the male anatomy to be positioned between the two pelvic support pads 180*a*, 180*b*. In some configurations, a cloth cover may be provided to extend between the two pelvic support pads 180*a*, 180*b* to support the male anatomy positioned between the two pelvic support pads 180*a*, 180*b* without placing pressure on the male anatomy for the comfort of male patients. In other configurations, a single pelvic support pad may be used, or three or more pelvic support pads may be provided.

The embodiment shown in FIG. 23 also illustrates another option for the thoracic support pad 185 of the thoracic bolster assembly 130. In this configuration the thoracic support pad 185 is formed in a generally T-shape, which may provide support for the upper chest of the patient, as well as direct support along the sternum. This direct support on the sternum may prevent unnecessary and uncomfortable pressure directly on the breasts of female patients. A cloth cover may similarly be provided to support the breasts of female patients without placing pressure on the breasts for the comfort of female patients. Such a cloth cover to support a female patient's breasts could be integral to a pad cover designed to fit over and onto thoracic support pad 185. Although thoracic support pad 185 is illustrated as having a generally T-shape, a skilled person will understand that the other pad shapes discussed in this disclosure could easily be used in this embodiment. In fact, any suitably shaped thoracic pad could be used in this embodiment.

EMBODIMENTS

The following embodiments are provided as examples only of specific configurations, materials, arrangements, etc. contemplated by the authors of this disclosure:

Embodiment 1. A patient support system, comprising:
- a pelvic bolster assembly and a thoracic bolster assembly, each comprising:
  - a base, the base having a lower portion and an upper portion, the lower portion and upper portion connected via a drive mechanism such that the upper portion is rotatable relative to the lower portion in a coronal plane of the patient, the lower portion of the base having a first channel on a first lateral side and a second channel on an opposing lateral side, the first and second channels slidably mountable with opposing rails of a surgical bed frame;
  - a first lateral bolster removably attached to a first lateral side of the upper portion of the base and a second lateral bolster removably attached to an opposing lateral side of the upper portion of the base, the first lateral bolster and second lateral bolster adjustable in a sagittal plane and in a transverse plane; and
  - wherein the pelvic bolster assembly further comprises a pelvic support pad attached to the upper portion of the base of the pelvic bolster assembly, wherein the thoracic bolster assembly further comprises a thoracic support pad attached to the upper portion of the base of the thoracic bolster assembly, and wherein the first lateral bolster and second lateral bolster further comprise a lateral support pad attached to each lateral bolster.

Embodiment 2. The patient support system of embodiment 1, wherein the drive mechanism is a worm gear, rack and pinion, or hypoid.

Embodiment 3. The patient support system of embodiment 1 or 2, wherein the drive mechanism is motorized.

Embodiment 4. The patient support system of any one of any of embodiments 1 to 3, wherein the drive mechanism is a worm drive.

Embodiment 5. The patient support system of embodiment 4, wherein the worm drive comprises a worm shaft attached to the lower portion of the base, and a worm gear attached to the upper portion of the base, the worm gear coupled to the worm shaft.

Embodiment 6. The patient support system of embodiment 5, further comprising a coronal adjustment handle coupled to the worm shaft.

Embodiment 7. The patient support system of any one of embodiments 1 to 6, wherein the first channel and second channel include a c-channel.

Embodiment 8. The patient support system of any one of embodiments 1 to 7, wherein one or more of the pelvic support pad, thoracic support pad, and lateral support pads are removable.

Embodiment 9. A patient support system, comprising:
- a pelvic bolster assembly comprising:
  - a base, the base having a lower portion and an upper portion, the lower portion and upper portion connected via a drive mechanism such that the upper portion is rotatable relative to the lower portion in a coronal plane, the lower portion of the base having a first channel on a first lateral side and a second channel on an opposing lateral side, the first and second channels slidably mountable on opposing rails of a surgical bed frame; and a first lateral bolster attached to a first lateral side of the upper portion of the base and a second lateral bolster attached to an opposing lateral side of the upper portion of the base, the first lateral bolster and second lateral bolster adjustable in a transverse plane;

and a thoracic bolster assembly, comprising:

a base, the base having a lower portion and an upper portion, the lower portion and upper portion connected via a drive mechanism such that the upper portion is rotatable relative to the lower portion in a coronal plane, the lower portion of the base having a first channel on a first lateral side and a second channel on an opposing lateral side, the first and second channels slidably mountable with opposing rails of a surgical bed frame; and a first lateral bolster attached to a first lateral side of the upper portion of the base and a second lateral bolster attached to an opposing lateral side of the upper portion of the base, the first lateral bolster and second lateral bolster adjustable in a sagittal plane and in a transverse plane.

Embodiment 10. The patient support system of embodiment 9, wherein the pelvic bolster assembly further comprises at least one pelvic support pad attached to the upper portion of the base of the pelvic bolster assembly, and wherein the thoracic bolster assembly further comprises a thoracic support pad attached to the upper portion of the base of the thoracic bolster assembly.

Embodiment 11. The patient support system of embodiment 10, wherein the at least one pelvic support pad comprises a first pelvic support pad and a second pelvic support pad.

Embodiment 12. The patient support system of embodiment 11, wherein the upper portion of the base of the pelvic bolster assembly further comprises a first gusset and a second gusset attached thereto, and wherein the first pelvic support pad is connected to the first gusset and the second pelvic support pad is connected to the second gusset.

Embodiment 13. The patient support system of embodiment 9, wherein the first lateral bolster of the pelvic bolster assembly is removably attached to the first lateral side of the upper portion of the base, and wherein the second lateral bolster is removably attached to the opposing lateral side of the upper portion of the base.

Embodiment 14. The patient support system of any one of embodiments 9 to 13, wherein the first and second channels of the pelvic bolster assembly are C-channels and the first and second channels of the thoracic bolster assembly are C-channels.

Embodiment 15. The patient support system of any one of embodiments 9 to 14, wherein the drive mechanism comprises a worm gear.

Embodiment 16. The patient support system of any one of embodiments 9 to 15, wherein the drive mechanism is motorized.

Embodiment 17. A method for positioning a patient, the method comprising:

selecting the patient support system of embodiment 9;

selecting a surgical bed frame having a longitudinal axis and two opposing side rails extending along the longitudinal axis;

slidably mounting the first and second channels of the pelvic bolster assembly on the two opposing side rails of the surgical bed frame; and slidably mounting the first and second channels of the thoracic bolster assembly on two opposing side rails of the surgical bed frame.

Embodiment 18. The method of embodiment 17, wherein the method further comprises sliding one or more of the pelvic bolster assembly and thoracic bolster assembly to selectively space apart the pelvic bolster assembly and thoracic bolster assembly.

Embodiment 19. The method of embodiment 17, wherein the method further comprises placing the patient in a prone position on the patient support system, including placing at least a portion of the patient's chest on the thoracic bolster assembly.

Embodiment 20. The method of embodiment 17, wherein the method further comprises placing the patient in a prone position on the patient support system, including placing at least a portion of the patient's pelvis on the pelvic bolster assembly.

Embodiment 21. The method of embodiment 20, further comprising engaging a coronal adjustment handle on the pelvic bolster assembly to rotate the pelvis of the patient about the coronal plane while the patient is supported by the pelvic bolster assembly.

Embodiment 22. The method of embodiment 21, wherein engaging the coronal adjustment handle on the pelvic bolster assembly comprises rotating the drive mechanism of the lower portion of the base, which in turn rotates the drive mechanism of the upper portion of the base about the coronal plane.

Embodiment 23. The method of embodiment 22, wherein the method further comprises engaging the coronal adjustment handle on the thoracic bolster assembly to rotate the chest of the patient about the coronal plane axis while the patient is supported by the thoracic bolster assembly.

Embodiment 24. The method of any one of embodiments 17 to 23, wherein the drive mechanism comprises a worm gear that includes a worm shaft.

Embodiment 25. The method of embodiment 24, wherein engaging the coronal adjustment handle on the thoracic bolster assembly comprises rotating the worm shaft of the lower portion of the base, which in turn rotates the worm gear of the upper portion of the base about the sagittal axis.

Embodiment 26. The method of embodiment 17, wherein the patient support system further comprises a first strap attached to the first lateral bolster and a buckle attached to the second lateral bolster, and wherein the method further comprises wrapping the first strap around the patient and securing the first strap to the buckle, and rotating the patient about a longitudinal axis of the surgical bed frame.

Embodiment 27. A patient support system, comprising:

a pelvic bolster assembly including a lower portion and an upper portion;

the lower portion comprising a substantially U-shaped plate extending from a first lateral side to a second opposing lateral side, a first channel on the first lateral side and a second channel on the opposing lateral side, the first and second channels for receiving opposing rails of a surgical bed frame and slidably mounting the plate on the surgical bed frame;

the lower portion further comprising at least one recessed track for receiving a plurality of roller bearings of the upper portion;

the upper portion comprising a substantially U-shaped base plate and the plurality of roller bearings rotatably attached to the U-shaped base plate, a first and a second pelvic support pad attached to the U-shaped base plate of the upper portion;

a first lateral bolster removably attached to a first lateral side of the upper portion of the base and a second lateral bolster removably attached to an opposing lateral side of the upper portion of the base, the first lateral bolster and second lateral bolster adjustable in a sagittal plane and in a transverse plane; and the upper portion and the lower portion of the pelvic bolster assembly connected via a drive mechanism such that the upper portion is rotatable relative to the lower portion about a coronal plane of the patient.

Embodiment 28. The patient support system of embodiment 27, further comprising a handle to rotate the upper portion relative to the lower portion about the coronal plane, wherein clockwise rotation of the handle causes clockwise rotation of the upper portion relative to the lower portion, and wherein counter-clockwise rotation of the handle causes counter-clockwise rotation of the upper portion.

Embodiment 29. The patient support system of embodiment 27 or embodiment 28, the upper portion further comprising an inner diameter support, the inner diameter support extending below the plate of the lower portion.

Embodiment 30. The patient support system of any of embodiments 27 to 29, further comprising a worm gear coupled to the upper portion and a worm shaft coupled to the lower portion, the worm gear and worm shaft being coupled.

Embodiment 31. The patient support system of embodiment 30, wherein the worm gear is coupled to the upper portion via the inner diameter support.

Embodiment 32. The patient support system of embodiment 30 or 31, wherein the handle is coupled to the worm shaft via one or more gears to enable a plane in which the handle is rotated to be parallel to a plane in which the upper portion is rotated.

Embodiment 33. A patient support system comprising:

a thoracic support assembly comprising a first base portion defining a first plane and a first patient-contacting portion defining a second plane, the first patient-contacting portion configured to be rotatable in the second plane; and a pelvic support assembly comprising a second base portion defining a third plane and a second patient-contacting portion defining a fourth plane, the second patient-contacting portion configured to be rotatable in the fourth plane.

Embodiment 34. The patient support system of embodiment 33, wherein the second plane is parallel to the first plane.

Embodiment 35. The patient support system of embodiment 33 or 34, wherein the fourth plane is parallel to the third plane.

Embodiment 36. The patient support system of embodiment 33, 34, or 35, wherein the thoracic support assembly and the pelvic support assembly are configured to be releasably secured to parallel rails of a surgical frame.

Embodiment 37. The patient support system of embodiment 36, wherein the thoracic support assembly and the pelvic support assembly are adjustable along the parallel rails of the surgical frame so as to adjust the distance between the two support assemblies.

Embodiment 38. The patient support system of embodiment 33, 34, 35, 36, or 37, wherein the first patient-contacting portion comprises a chest support and at least one lateral support.

Embodiment 39. The patient support system of embodiment 33, 34, 35, 36, 37, or 38, wherein the second patient-contacting portion comprises a pair of pelvic supports and at least one lateral support.

Embodiment 40. The patient support system of embodiment 38 or 39, wherein the at least one lateral support is releasably secured to the first patient-contacting portion and/or second patient-contacting portion.

Embodiment 41. The patient support system of embodiment 38, 39, or 40, wherein the at least one lateral support is adjustable in a lateral direction.

Embodiment 42. The patient support system of embodiment 41, wherein the at least one lateral support has a locking mechanism configured to allow the at least one lateral support to be freely moved medially while simultaneously locking the lateral support from moving laterally unless the locking mechanism is released.

Embodiment 43. The patient support system of embodiment 38, 39, 40, 41, or 42, wherein the at least one lateral support is configured to rotate in a sagittal plane.

Embodiment 44. The patient support system of embodiment 38, 39, 40, 41, 42, or 43, wherein the at least one lateral support is configured to rotate in a transverse plane.

Embodiment 45. The patient support system of embodiment 44, wherein at least one of the at least one lateral support of the first patient-contacting portion and/or the second patient-contacting portion include a strap configured to secure a patient in the patient support system.

Embodiment 46. The patient support system of embodiment 45, wherein the strap is releasably secured to the at least one lateral support of the first patient-contacting portion and/or the second patient-contacting portion.

Embodiment 47. The patient support system of embodiment 45 or 46, wherein the strap is configured to extend from one lateral support and connect with or loop through another lateral support.

Embodiment 48. The patient support system of embodiment 33, 34, 35, 36, 37, 38, 39, 41, 42, 43, 44, 45, 46, or 47, wherein the thoracic support assembly and/or the pelvic support assembly include one or more mechanisms configured to rotate the first patient-contacting portion and/or the second patient-contacting portion.

Embodiment 49. The patient support system of embodiment 48, wherein the one or more mechanisms is/are positioned laterally on the thoracic support assembly and/or on the pelvic support assembly.

Embodiment 50. The patient support system of embodiment 49, wherein the one or more mechanisms is/are a worm gear.

Embodiment 51. The patient support system of embodiment 33, 34, 35, 36, 37, 38, 39, 41, 42, 43, 44, 45, 46, 47, 48, 49, or 50, wherein at least one of the thoracic support assembly and the pelvic support assembly is semi-circular in shape.

Embodiment 52. The patient support system of embodiment 33, 34, 35, 36, 37, 38, 39, 41, 42, 43, 44, 45, 46, 47, 48, 49, 50, or 51, wherein at least one of the thoracic support assembly and the pelvic support assembly is rectangular in shape.

Embodiment 53. The patient support system of embodiment 33, 34, 35, 36, 37, 38, 39, 41, 42, 43, 44, 45, 46, 47, 48, 49, 50, 51, or 52, wherein the first base portion and the third base portion each define a cranial-caudal length with the cranial-caudal length of the first base portion being less than the cranial-caudal length of the third base portion.

Embodiment 54. The patient support system of embodiment 33, 34, 35, 36, 37, 38, 39, 41, 42, 43, 44, 45, 46, 47, 48, 49, 50, 51, 52, or 53, wherein the first patient-contacting support, the second patient-contacting support, and/or the at least one lateral support include a compressible pad.

Embodiment 55. The patient support system of embodiment 54, wherein the compressible pad is removable from the patient support system.

Embodiment 56. The patient support system of embodiment 33, 34, 35, 36, 37, 38, 39, 41, 42, 43, 44, 45, 46, 47, 48, 49, 50, 51, 52, 53, 54, or 55, wherein the patient support system comprises one or more radiolucent materials.

Embodiment 57. The patient support system of embodiment 33, 34, 35, 36, 37, 38, 39, 41, 42, 43, 44, 45, 46, 47, 48, 49, 50, 51, 52, 53, 54, 55, or 56, wherein the patient support system comprises one or more radiopaque materials.

Embodiment 58. The patient support system of embodiment 56 or 57, wherein the one or more radiolucent materials include carbon fiber.

Embodiment 59. The patient support system of embodiment 57 or 58, wherein the one or more radiopaque materials are used to provide a fluoroscopic indication of the degree of rotation of the first patient-contacting portion and/or the second patient-contacting portion.

Embodiment 60. The patient support system of embodiment 33, 34, 35, 36, 37, 38, 39, 41, 42, 43, 44, 45, 46, 47, 48, 49, 50, 51, 52, 53, 54, 55, 56, 57, 58, or 59, wherein the first base portion and/or the second base portion comprises one or more bed rails configured to allow for attachment of medical equipment, such as a C-arm or A-arm.

The various embodiments described above, including elements of the various embodiments described above, can be combined to provide further embodiments. Various portions and components of apparatus within the scope of this disclosure, including for example, structural components, can be formed by one or more various suitable manufacturing processes known to those in the art. Similarly, various portions and components of apparatuses within the scope of this disclosure can be made from suitable materials known to those in the art.

The above description has set out various features, functions, methods, and other aspects of the disclosure. Time and further development may change the manner in which the various aspects are implemented.

The scope of protection defined by the claims is not intended to be limited to the specific sizes, shapes, features, or other aspects of the disclosed embodiments. The claimed inventions may be implemented or embodied in other forms while still being within the scopes of the concepts disclosed hereby. Also included are equivalents of the elements of the claims that can be made without departing from the scopes of concepts properly protected by the claims that follow.

The invention claimed is:

1. A patient support system, comprising:

a pelvic bolster assembly including a lower portion and an upper portion;

the lower portion comprising:

a substantially U-shaped plate extending from a first lateral side to a second opposing lateral side, a first channel in connection with the first lateral side and a second channel in connection with the opposing lateral side, the first and second channels for receiving opposing rails of a surgical bed frame and slidably mounting the substantially U-shaped plate on the surgical bed frame;

the lower portion further comprising at least one recessed track for receiving a plurality of roller bearings of the upper portion;

the upper portion comprising:

a substantially U-shaped base plate, the plurality of roller bearings rotatably connecting the upper portion to the lower portion;

a first and a second pelvic support pad attached to the substantially U-shaped base plate of the upper portion;

a first lateral bolster removably attached to a first lateral side of the upper portion of the substantially U-shaped base plate and a second lateral bolster removably attached to an opposing lateral side of the upper portion of the substantially U-shaped base plate, the first lateral bolster and second lateral bolster adjustable in a sagittal plane and in a transverse plane; and the upper portion and the lower portion of the pelvic bolster assembly connected via a drive mechanism such that the upper portion is rotatable relative to the lower portion about a coronal plane of the patient.

2. The patient support system of claim 1, further comprising a handle to rotate the upper portion relative to the lower portion about the coronal plane, wherein clockwise rotation of the handle causes clockwise rotation of the upper portion relative to the lower portion, and wherein counter-clockwise rotation of the handle causes counter-clockwise rotation of the upper portion.

3. The patient support system of claim 1, the upper portion further comprising an inner diameter support, the inner diameter support extending below the substantially U-shaped base plate of the lower portion.

4. The patient support system of claim 1, further comprising a worm gear coupled to the upper portion and a worm shaft coupled to the lower portion, the worm gear and worm shaft being coupled.

5. The patient support system of claim 1, further comprising a thoracic bolster assembly, the thoracic bolster assembly comprising:

a base, the base having a lower portion and an upper portion, the lower portion and upper portion connected via a drive mechanism such that the upper portion is rotatable relative to the lower portion in a coronal plane of the patient, the lower portion of the base having a first channel on a first lateral side and a second channel on an opposing lateral side, the first and second channels slidably mountable with opposing rails of a surgical bed frame; and a first lateral bolster removably attached to a first lateral side of the upper portion of the base and a second lateral bolster removably attached to an opposing lateral side of the upper portion of the base, the first lateral bolster and second lateral bolster adjustable relative to the upper portion in a sagittal plane and in a transverse plane.

6. The patient support system of claim 5, wherein the first lateral bolster and second lateral bolster are further adjustable relative to the upper portion in a transverse plane.

7. The patient support system of claim 5, further comprising a pelvic support pad removably attached to upper portion of the base of the pelvic bolster assembly, a thoracic support pad removably attached to the upper portion of the base of the thoracic bolster assembly, and a lateral support pad removably attached to each lateral bolster.

8. The patient support system of claim 7, further comprising a plurality of removable pad covers configured and shaped to cover each one of the pelvic support pad, thoracic support pad, and the lateral support pads.

9. The patient support system of claim 7, wherein the pelvic support pad comprises a first pelvic support pad and a second pelvic support pad.

10. The patient support system of claim 9, wherein the upper portion of the base of the pelvic bolster assembly further comprises a first gusset and a second gusset attached thereto, and wherein the first pelvic support pad is connected to the first gusset and the second pelvic support pad is connected to the second gusset.

11. The patient support system of claim 7, wherein one or more of the pelvic support pad, thoracic support pad, and lateral support pads are removable.

12. A patient support system, comprising:

a pelvic bolster assembly and a thoracic bolster assembly, each comprising:

a base, the base having a lower portion and an upper portion, the lower portion and upper portion connected via a drive mechanism such that the upper portion is rotatable relative to the lower portion in a coronal plane of the patient, the lower portion of the base having a first channel on a first lateral side and a second channel on an opposing lateral side, the first and second channels slidably mountable with opposing rails of a surgical bed frame;

a first lateral bolster removably attached to a first lateral side of the upper portion of the base and a second lateral bolster removably attached to an opposing lateral side of the upper portion of the base, the first lateral bolster and second lateral bolster adjustable relative to the upper portion in a sagittal plane and in a transverse plane;

wherein the pelvic bolster assembly further comprises a pelvic support pad attached to the upper portion of the base of the pelvic bolster assembly, wherein the thoracic bolster assembly further comprises a thoracic support pad attached to the upper portion of the base of the thoracic bolster assembly, and wherein the first lateral bolster and second lateral bolster further comprise a lateral support pad attached to each lateral bolster; and wherein the lower portion of the base of the pelvic bolster assembly is a substantially U-shaped plate extending from a first lateral side to a second opposing lateral side.

13. The patient support system of claim 12, wherein the drive mechanism is a worm gear, rack and pinion, or hypoid.

14. The patient support system of claim 12, wherein the drive mechanism is motorized.

15. The patient support system of claim 12, wherein the drive mechanism is a worm drive.

16. The patient support system of claim 15, wherein the worm drive comprises a worm shaft attached to the lower portion of the base, and a worm gear attached to the upper portion of the base, the worm gear coupled to the worm shaft.

17. The patient support system of claim 16, further comprising a coronal adjustment handle coupled to the worm shaft.

18. The patient support system of claim 12, wherein the first channel and second channel include a c-channel.

19. The patient support system of claim 12, wherein one or more of the pelvic support pad, thoracic support pad, and lateral support pads are removable.

20. A patient support system, comprising:

a pelvic bolster assembly including a lower portion and an upper portion;

the lower portion comprising:

a substantially U-shaped plate extending from a first lateral side to a second opposing lateral side, a first channel in connection with the first lateral side and a second channel in connection with the opposing lateral side, the first and second channels for receiving opposing rails of a surgical bed frame and slidably mounting the substantially U-shaped plate on the surgical bed frame;

the lower portion further comprising at least one recessed track for receiving a plurality of roller bearings of the upper portion;

the upper portion comprising:

a substantially U-shaped base plate, the plurality of roller bearings rotatably connecting the upper portion to the lower portion;

a first and a second pelvic support pad attached to the substantially U-shaped base plate of the upper portion;

and a thoracic bolster assembly comprising:

a base, the base having a lower portion and an upper portion, the lower portion and upper portion connected via a drive mechanism such that the upper portion is rotatable relative to the lower portion in a coronal plane, the lower portion of the base having a first channel on a first lateral side and a second channel on an opposing lateral side, the first and second channels slidably mountable with opposing rails of a surgical bed frame; and a first lateral bolster attached to a first lateral side of the upper portion of the base and a second lateral bolster attached to an opposing lateral side of the upper portion of the base, the first lateral bolster and second lateral bolster adjustable in a sagittal plane and in a transverse plane.

* * * * *